(12) United States Patent
Ito

(10) Patent No.: US 11,016,352 B1
(45) Date of Patent: May 25, 2021

(54) ELECTRO-OPTICAL DEVICE, MANUFACTURING METHOD FOR ELECTRO-OPTICAL DEVICE, AND ELECTRONIC APPARATUS

(71) Applicant: SEIKO EPSON CORPORATION, Tokyo (JP)

(72) Inventor: Satoshi Ito, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/953,267

(22) Filed: Nov. 19, 2020

(30) Foreign Application Priority Data

Nov. 25, 2019 (JP) .............................. JP2019-212096

(51) Int. Cl.
*G02F 1/1335* (2006.01)
*G02F 1/1333* (2006.01)
*G02F 1/1362* (2006.01)

(52) U.S. Cl.
CPC .... *G02F 1/13624* (2013.01); *G02F 1/133345* (2013.01); *G02F 1/133526* (2013.01); *G02F 1/136227* (2013.01); *G02F 2201/123* (2013.01)

(58) Field of Classification Search
CPC ............ G02F 1/133526; G02F 1/1368; G02F 1/134309; G02F 1/136227; G02F 1/133512; G02F 1/1362; G02F 1/1343; G02F 1/134336; G02F 1/13624; G02F 1/136209; G02F 1/133345; G02F 2201/122; G02F 2201/123
See application file for complete search history.

(56) References Cited

U.S. PATENT DOCUMENTS

2015/0041833 A1  2/2015  Nimura

FOREIGN PATENT DOCUMENTS

JP   2011081229   4/2011
JP   2015034860   2/2015

*Primary Examiner* — Thoi V Duong
(74) *Attorney, Agent, or Firm* — JCIPRNET

(57) ABSTRACT

An electro-optical device includes a pixel electrode group including a first pixel electrode and a second pixel electrode, a layered body including a plurality of insulating layers, a first transistor, and a second transistor, a lens layer including a first lens overlapping with the first pixel electrode and a second lens overlapping with the second pixel electrode, a first contact that electrically couples the first transistor and the first pixel electrode, and a second contact that electrically couples the second transistor and the second pixel electrode. The layered body, the lens layer, and the pixel electrode group are arranged in this order. Each of the first lens and the second lens, and the layered body are disposed with a space interposed therebetween layered body, and each of the first contact and the second contact extends through the lens layer and the space.

11 Claims, 18 Drawing Sheets

ELECTRO-OPTICAL DEVICE, MANUFACTURING METHOD FOR ELECTRO-OPTICAL DEVICE, AND ELECTRONIC APPARATUS

The present application is based on, and claims priority from JP Application Serial Number 2019-212096, filed Nov. 25, 2019, the disclosure of which is hereby incorporated by reference herein in its entirety.

BACKGROUND

1. Technical Field

The present disclosure relates to an electro-optical device, a manufacturing method for an electro-optical device, and an electronic apparatus.

2. Related Art

In an electro-optical device such as a liquid crystal device, an optical substrate provided with a plurality of lenses is used to suppress light quantity loss. In JP-A-2015-34860, a substrate for an electro-optical device is disclosed that is provided with microlenses. This substrate for the electro-optical device is provided with a first lens, which is provided between a substrate having a recessed surface and a switching element and which overlaps with a pixel electrode in plan view, and a second lens, which is provided between the switching element and the pixel electrode and which overlaps with the pixel electrode in plan view. The first lens fills the inside of the recessed surface provided in the quartz substrate, and includes a lens layer formed of a silicon oxynitride film (SiON) having a refractive index greater than that of the quartz substrate, and the second lens fills the inside of the recessed surface and is provided on an interlayer insulating film, which is formed of silicon oxide (SiO2) and disposed between the switching element and the pixel electrode. The second lens includes a lens layer formed of a silicon oxynitride film having a refractive index higher than that of the interlayer insulating film.

From the perspective of enhancing lens performance, it is preferable to increase a difference in the refractive index between the substrate and the lens layer. It is conceivable, for example, to increase the refractive index of the lens layer in order to increase the difference in the refractive index. However, generally, the greater the refractive index of the lens layer, the lower the transmittance of light. Therefore, in a known configuration in which the substrate and the lens layer are in contact, when attempting to increase the refractive index of the lens layer, the transmittance of light in the lens layer decreases. Therefore, there is a problem in that it is difficult to improve the performance of the lens while suppressing a decrease in the transmittance of light.

SUMMARY

An aspect of the electro-optical device according to the present disclosure includes a pixel electrode group including a first pixel electrode and a second pixel electrode, a layered body including a plurality of insulating layers, a first transistor disposed at the layered body, a second transistor disposed at the layered body, a lens layer including a first lens that overlaps with the first pixel electrode when viewed from a thickness direction of the layered body, and a second lens that overlaps with the second pixel electrode when viewed from the thickness direction, a first contact configured to electrically couple the first transistor and the first pixel electrode, and a second contact configured to electrically couple the second transistor and the second pixel electrode. The layered body, the lens layer, and the pixel electrode group are arranged in this order. Each of the first lens and the second lens, and the layered body are disposed with a space interposed therebetween layered body, and each of the first contact and the second contact extends through the lens layer and the space.

An aspect of a manufacturing method for an electro-optical device according to the present disclosure includes forming a layered body in which a plurality of insulating layers are layered, a first transistor disposed at the layered body, and a second transistor disposed at the layered body, forming a sacrificial layer at the layered body, the sacrificial layer including an inorganic material, forming a lens layer at the sacrificial layer, the lens layer including a first lens and a second lens, forming a first hole extending through the sacrificial layer and the lens layer and a second hole extending through the sacrificial layer and the lens layer, forming a first contact in the first hole, the first contact being electrically coupled with the first transistor, forming a second contact in the second hole, the second contact being electrically coupled with the second transistor, forming a through hole in the lens layer, forming a space between the lens layer and the layered body by removing the sacrificial layer using the through hole, and forming a first pixel electrode overlapping with the first lens when viewed from a thickness direction of the lens layer, the first pixel electrode being coupled to the first contact, and a second pixel electrode overlapping with the second lens when viewed from the thickness direction, the second pixel electrode being coupled to the second contact.

DESCRIPTION OF EXEMPLARY EMBODIMENTS

Figure 1:
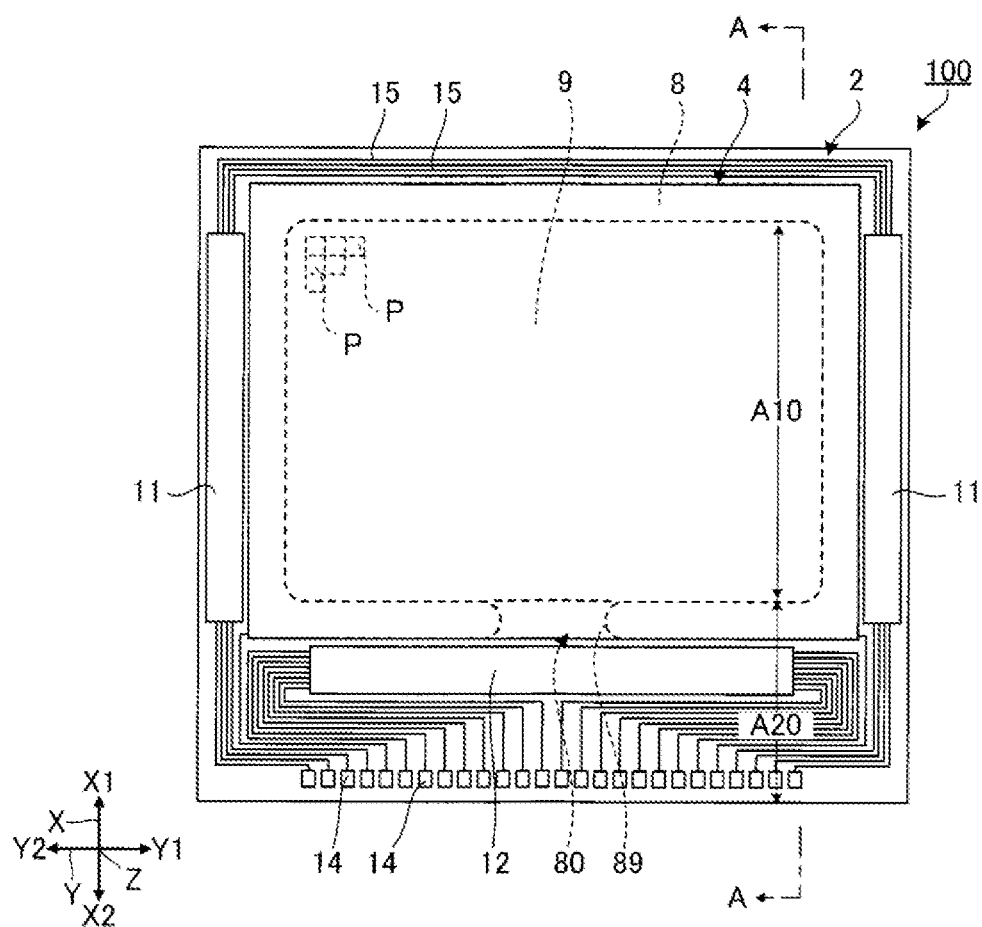
FIG. 1 is a plan view of an electro-optical device according to a first embodiment.

Preferred embodiments of the present disclosure will be described below with reference to the accompanying drawings. Note that, in the drawings, dimensions or a scale of each of portions differ from the actual dimensions and scale where appropriate, and some of the portions are schematically illustrated to make them easily recognizable. Further, insofar as there is no notation in the following description indicating a particular limitation on the present disclosure, the scope of the present disclosure is not limited to these embodiments. Also, the expression "an element B is formed on an element A" is not limited to a configuration in which the element A and the element B are in direct contact. A configuration in which the element A and the element B are not in direct contact is also encompassed by the concept "the element B is formed on the element A".

1. Electro-Optical Device

As an example of an electro-optical device of the present disclosure, an active matrix liquid crystal device will be described.

1A. Basic Configuration

Figure 2:
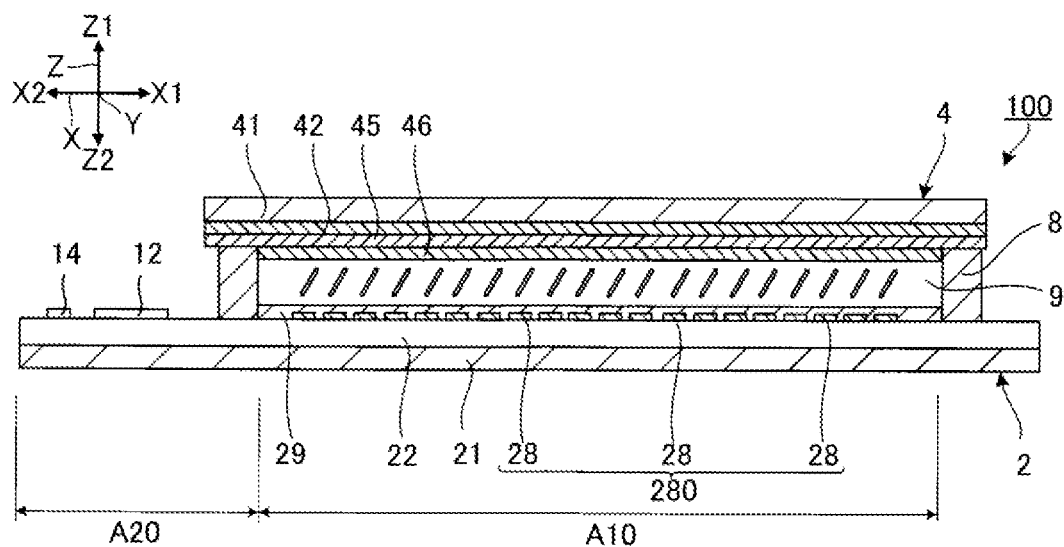
FIG. 2 is a cross-sectional view taken along a line A-A in FIG. 1.

FIG. 1 is a plan view of an electro-optical device 100 according to a first embodiment. FIG. 2 is a cross-sectional view taken along a line A-A in FIG. 1. Note that, for convenience of explanation, the description below will be made as appropriate using an X-axis, a Y-axis, and a Z-axis that are orthogonal to each other. Further, one direction along the X-axis is referred to as a direction X1, and the direction opposite the direction X1 is referred to as a direction X2. Similarly, one direction along the Y-axis is referred to as a direction Y1, and the direction opposite the direction Y1 is referred to as a direction Y2. One direction along the Z axis is referred to as a direction Z1, and the direction opposite the direction Z1 is referred to as a direction Z2.

The electro-optical device 100 illustrated in FIG. 1 and FIG. 2 is a transmissive-type liquid crystal display device. As illustrated in FIG. 2, the electro-optical device 100 includes a transmissive element substrate 2, a transmissive counter substrate 4, a frame-shaped sealing member 8, and a liquid crystal layer 9. The sealing member 8 is disposed between the element substrate 2 and the counter substrate 4. The liquid crystal layer 9 is disposed in a region surrounded by the element substrate 2, the counter substrate 4, and the sealing member 8. The element substrate 2, the liquid crystal layer 9, and the counter substrate 4 are arranged along the Z axis. The surface of a first base member 21 included in the element substrate 2 is parallel to the X-Y plane. In the following description, viewing from the direction Z1 or the direction Z2 is referred to as "plan view".

In the electro-optical device 100 of the present embodiment, the light is incident on the element substrate 2, for example, is transmitted through the liquid crystal layer 9, and is emitted from the counter substrate 4. Note that the light may be incident on the counter substrate 4, be transmitted through the liquid crystal layer 9, and be emitted from the element substrate 2. The light is visible light. In the following description, "transmissive" means transmittance with respect to visible light, and means that a transmittance of visible light is preferably equal to or greater than 50%. Further, the liquid crystal display device 100 illustrated in FIG. 1 has a rectangular shape in plan view, but the shape of the liquid crystal display device 100 in plan view is not limited to the rectangular shape and may be a circular shape or the like, for example.

As illustrated in FIG. 2, the element substrate 2 includes the first base member 21, a layered body 22, a pixel electrode group 280, and a first oriented film 29. The thickness direction of the layered body 22 is the same as the direction Z1 or the direction Z2. In addition, although not illustrated in FIG. 2, a lens layer 25, which will be described later, is provided between the layered body 22 and the pixel electrode group 280. The first base member 21 includes a transmissive plate having insulating properties. The first base member 21 includes glass, quartz, or the like, for example. The layered body 22 is transmissive and has insulating properties. Note that, although not illustrated in FIG. 2, a plurality of wiring lines and the like are disposed in the layered body 22. Further, the pixel electrode group 280 includes a plurality of pixel electrodes 28. Each of the plurality of pixel electrodes 28 is formed of a transparent conductive material, such as indium tin oxide (ITO) or indium zinc oxide (IZO), for example. The first oriented film 29 is positioned closest to the liquid crystal layer 9 in the element substrate 2, and orients liquid crystal molecules of the liquid crystal layer 9. Examples of the constituent material of the first oriented film 29 include polyimide and silicon oxide, for example. Note that the element substrate 2 will be described later.

As illustrated in FIG. 2, the counter substrate 4 includes a second base member 41, an insulating film 42, a common electrode 45, and a second oriented film 46. The second base member 41, the insulating film 42, the common electrode 45, and the second oriented film 46 are arranged in this order. The second oriented film 46 is positioned closest to the liquid crystal layer 9. The second base member 41 includes a transmissive plate having insulating properties. The second base member 41 includes glass, quartz, or the like, for example. The insulating film 42 is formed of a transmissive silicon-based inorganic material having insulating properties, such as silicon oxide, for example. The common electrode 45 is formed of a transparent conductive material, such as ITO or IZO, for example. The second oriented film 46 orients the liquid crystal molecules of the liquid crystal layer 9. Examples of the constituent material of the second oriented film 46 include polyimide and silicon oxide, for example.

The sealing member 8 is formed using an adhesive or the like containing various types of curable resin, such as an epoxy resin, for example. The sealing member 8 is fixed to each of the element substrate 2 and the counter substrate 4. An injection port 89 for injecting a liquid crystal material containing the liquid crystal molecules into the sealing member 8 is formed in a portion, in a circumferential direction, of the sealing member 8. The injection port 89 is sealed by a sealing material 80 formed using various types of resin material.

The liquid crystal layer 9 contains the liquid crystal molecules having positive or negative dielectric anisotropy. The liquid crystal layer 9 is interposed between the element substrate 2 and the counter substrate 4 such that the liquid crystal molecules are in contact with both the first oriented film 29 and the second oriented film 46. The liquid crystal layer 9 is disposed between the plurality of pixel electrodes 28 and the common electrode 45, and the optical characteristics thereof change in accordance with an electric field. Specifically, the orientation of the liquid crystal molecules included in the liquid crystal layer 9 changes depending on a voltage applied to the liquid crystal layer 9.

As illustrated in FIG. 1, a plurality of scanning line drive circuits 11, a data line drive circuit 12, a plurality of external terminals 14, and a plurality of routing wiring lines 15 are arranged on a surface of the element substrate 2 on the counter substrate 4 side. Each of the plurality of routing wiring lines 15 is coupled to one of the plurality of external terminals 14. Further, each of the plurality of routing wiring lines 15 is coupled to the scanning line drive circuit 11 or the data line drive circuit 12.

The electro-optical device 100 having the above-described configuration includes a display region A10 that displays an image, and a peripheral region A20 surrounding the display region A10 in plan view. The display region A10 includes a plurality of pixels P arranged in a matrix. The plurality of pixel electrodes 28 are disposed in a one-to-one manner with respect to the plurality of pixels P. The scanning line drive circuits 11, the data line drive circuit 12, and the like are disposed in the peripheral region A20.

1B. Electrical Configuration

Figure 3:
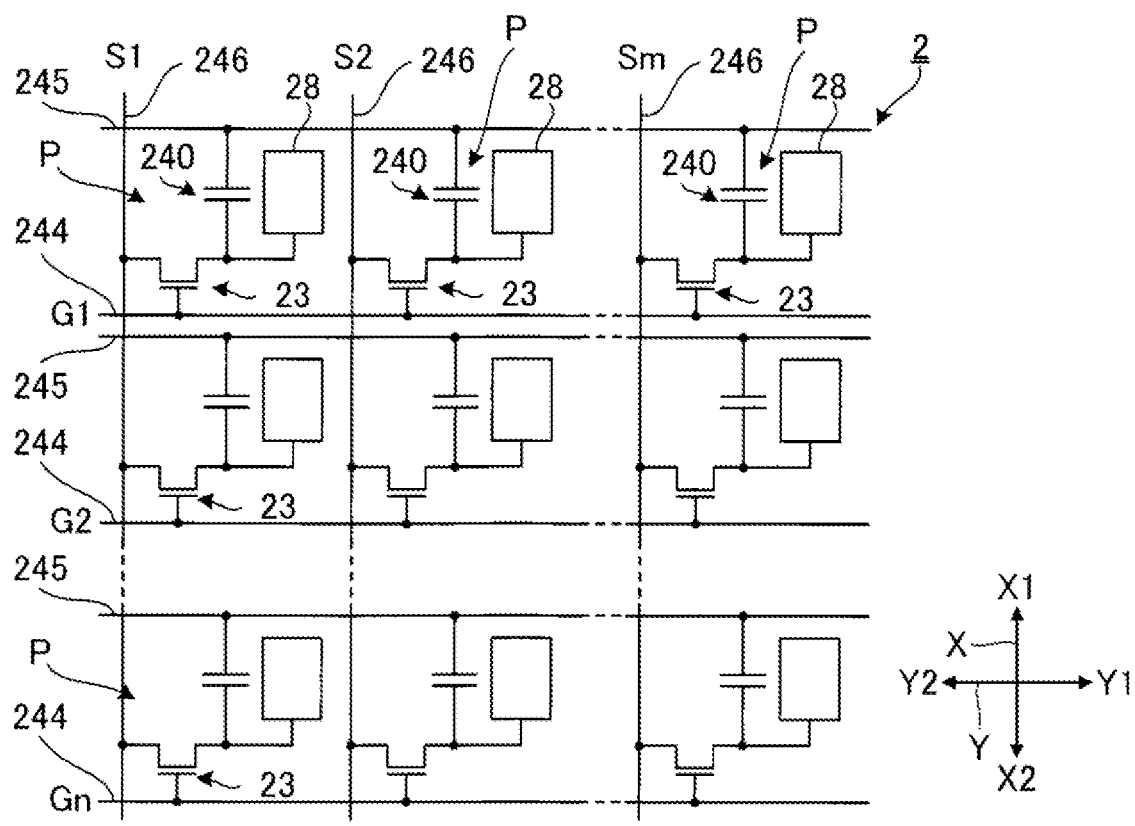
FIG. 3 is an equivalent circuit diagram illustrating an electrical configuration of an element substrate.

FIG. 3 is an equivalent circuit diagram illustrating the electrical configuration of the element substrate 2. As illustrated in FIG. 3, the element substrate 2 includes n scanning lines 244, m data lines 246, n capacitance lines 245, a plurality of transistors 23, and a plurality of storage capacitors 240. These are arranged at the layered body 22 illustrated in FIG. 2. Note that both n and m are integers of 2 or greater. The plurality of pixel electrodes 28 are disposed in a one-to-one manner with respect to the plurality of transistors 23. Each of the transistors 23 is a TFT that functions as a switching element, for example. Each of the transistors 23 includes a gate, a source, and a drain.

Each of the n scanning lines 244 extends along the Y-axis, and the n scanning lines 244 are arranged at equal intervals along the X-axis. Each of the n scanning lines 244 is electrically coupled to the respective gate of some of the transistors 23, among all the transistors 23. Further, the n scanning lines 244 are electrically coupled to the scanning line driving circuits 11 illustrated in FIG. 1. Scanning signals G1, G2, . . . , Gn are line-sequentially supplied from the scanning line driving circuits 11 to the first to n scanning lines 244.

Each of the m data lines 246 illustrated in FIG. 3 extends along the X-axis, and the m data lines 246 are arranged at equal intervals along the Y-axis. Each of the m data lines 246 is electrically coupled to the respective source of some of the transistors 23, among all the transistors 23. Further, the m data lines 246 are electrically coupled to the data line driving circuit 12 illustrated in FIG. 1. Image signals S1, S2, . . . , Sm are line-sequentially supplied from the data line driving circuit 12 to the first to m data lines 246.

The n scanning lines 244 and the m data lines 246 are insulated from each other and are formed in a lattice-like pattern in plan view. An area surrounded by two of the adjacent scanning lines 244 and two of the adjacent data lines 246 corresponds to the pixel P. The drain of the corresponding transistor 23 is electrically coupled to each of the pixel electrodes 28.

Each of the n capacitance lines 245 extends along the Y-axis, and the n capacitance lines 245 are arranged at equal intervals along the X-axis. Further, the n capacitance lines 245 are insulated from the m data lines 246 and the n scanning lines 244, and are formed so as to be separated from the m data lines 246 and the n scanning lines 244. A fixed potential, such as a ground potential, for example, is applied to each of the capacitance lines 245. Also, each of the n capacitance lines 245 is electrically coupled to some of the storage capacitors 240, among all the storage capacitors 240. The plurality of storage capacitors 240 are electrically coupled in a one-to-one manner with respect to the plurality of pixel electrodes 28. Further, the plurality of storage capacitors 240 are electrically coupled in a one-to-one manner with respect to the drains of the plurality of transistors 23. Each of the storage capacitors 240 is a capacitive element for holding the potential of the pixel electrode 28.

When the scanning signals G1, G2, . . . , Gn become sequentially active and the n scanning lines 244 are sequentially selected, the transistor 23 coupled to the selected scanning line 244 is switched to an on state. Then, the image signals S1, S2, . . . , Sm having magnitudes commensurate with the grayscale to be displayed are respectively transmitted, via the m data line 246, to the pixel P corresponding to the selected scanning line 244, and are then applied to the pixel electrode 28. In this way, a voltage commensurate with the grayscale to be displayed is applied to a liquid crystal capacitor formed between each of the pixel electrodes 28 and the common electrode 45 of the counter substrate 4 illustrated in FIG. 2, and the orientation of the liquid crystal molecules changes in accordance with the applied voltage. Further, the applied voltage is held by the storage capacitor 240. Such changes in the orientation of the liquid crystal molecules cause the light to be modulated, and the grayscale display is thus possible.

1C. Configuration of Element Substrate 2

Figure 4:
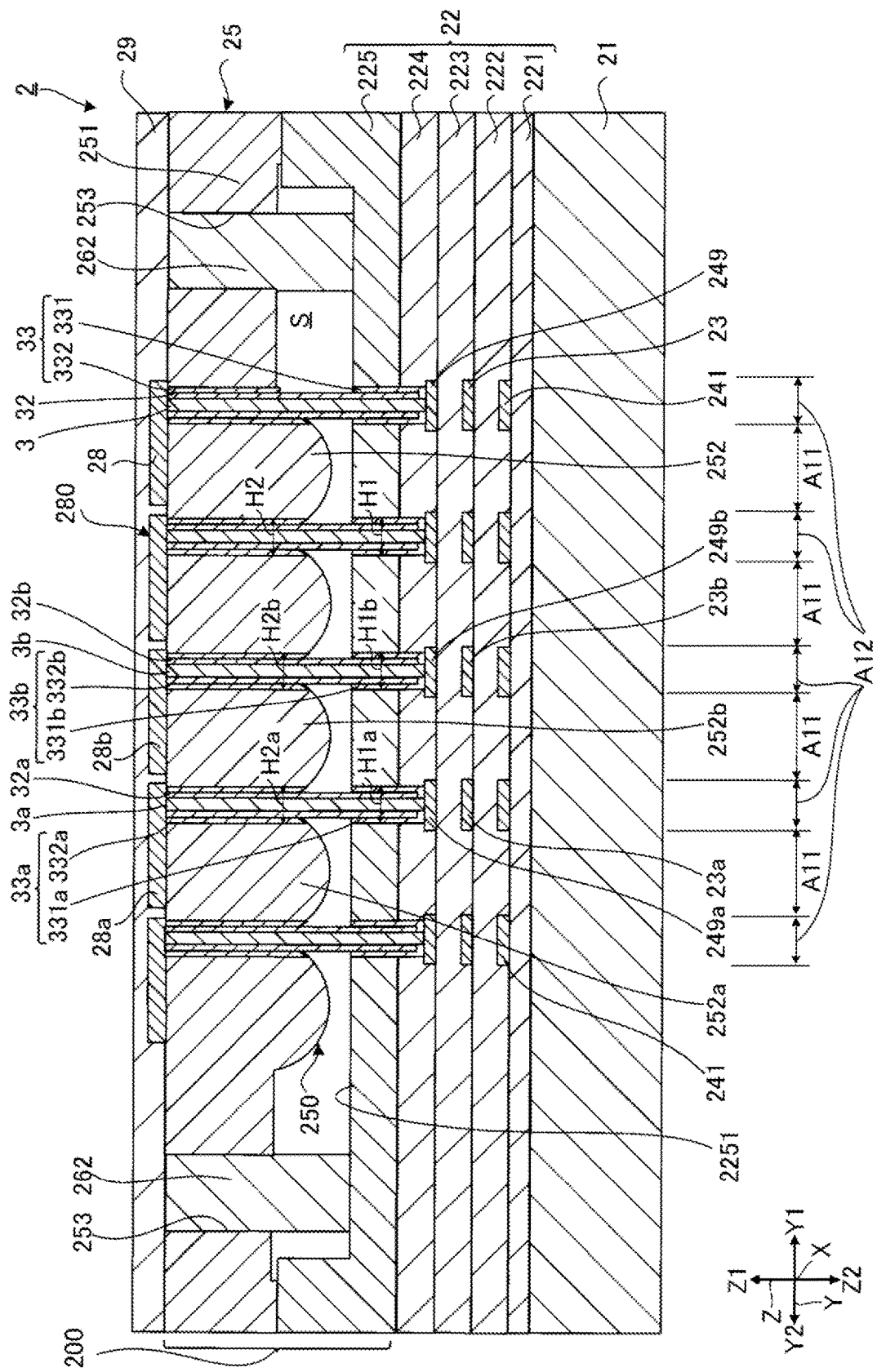
FIG. 4 is a cross-sectional view illustrating the element substrate.

In the following description, the direction Z1 is described as being upward and the direction Z2 as downward. FIG. 4 is a cross-sectional view illustrating the element substrate 2. As illustrated in FIG. 4, the element substrate 2 includes the first base member 21, the layered body 22, the lens layer 25, the pixel electrode group 280, and the first oriented film 29. The layered body 22, the lens layer 25, a light-transmitting layer 26, and the pixel electrode group 280 are arranged in this order from the first base member 21 toward the first oriented film 29. Here, a given one of the plurality of pixel electrodes 28 included in the pixel electrode group 280 is a "first pixel electrode 28a", and any other of the pixel electrodes 28 is a "second pixel electrode 28b". Further, the element substrate 2 includes a plurality of contacts 3, a plurality of inorganic material films 32, and a plurality of protective portions 33. Further, the element substrate 2 includes two light-transmitting portions 262. Hereinafter, each of the elements will be described.

As illustrated in FIG. 4, the layered body 22 is disposed on the first base member 21. The layered body 22 includes a plurality of insulating layers 221, 222, 223, 224, and 225. The insulating layers 221, 222, 223, 224, and 225 are layered in this order from the first base member 21 toward the pixel electrode group 280. Note that the number of layers included in the layered body 22 is not limited to five. For example, the number of layers is appropriately set according to various wiring arrangements and the like.

A plurality of light-shielding films 241, the plurality of transistors 23, and a plurality of relay electrodes 249 are disposed at the layered body 22. Also, although not illustrated in FIG. 4, the wiring lines illustrated in FIG. 3 and the like are disposed in the layered body 22. Specifically, the above-described plurality of scanning lines 244, plurality of capacitance lines 245, plurality of storage capacitors 240, and plurality of data lines 246 are disposed in the layered body 22.

As illustrated in FIG. 4, the plurality of light-shielding films 241 are disposed between the insulating layer 221 and the insulating layer 222. The plurality of light-shielding films 241 are disposed in a one-to-one manner with respect to the plurality of transistors 23. Each of the light-shielding films 241 blocks light from entering the corresponding transistor 23. The material of each of the light-shielding films 241 is not particularly limited, and examples thereof include metals, such as tungsten.

The plurality of transistors 23 are disposed between the insulating layer 222 and the insulating layer 223. The transistor 23 corresponding to the first pixel electrode 28a is a "first transistor 23a", and the transistor 23 corresponding to the second pixel electrode 28b is a "second transistor 23b". Although not illustrated, each of the transistors 23 includes a semiconductor layer, a gate electrode, and a gate insulating layer. The semiconductor layer has a source region, a drain region, and a channel region. The semiconductor layer is formed of polysilicon, for example. Regions of the semiconductor layer excluding the channel region are doped with impurities that increase conductivity. Further, the gate electrode is formed by being doped with impurities that increase the conductivity to the polysilicon, for example. Note that the gate electrode may be formed from a material having conductivity with respect to metal, metal silicides, and metal compounds.

The plurality of relay electrodes 249 are disposed between the insulating layer 223 and the insulating layer 224. The plurality of relay electrodes 249 are disposed in a one-to-one manner with respect to the plurality of transistors 23. Each of the relay electrodes 249 is electrically coupled to the drain of the corresponding transistor 23. The relay electrode 249 electrically coupled to the first transistor 23a is a "first relay electrode 249a", and the relay electrode 249 electrically coupled to the second transistor 23b is a "second relay electrode 249b".

The material of each of the relay electrodes 249, and the material of each wiring lines not illustrated in FIG. 4 are, for example, a metal such as tungsten (W), titanium (Ti), chromium (Cr), iron (Fe), and aluminum (Al), a metal nitride, a metal silicide, and the like. Note that, although not illustrated, each of the wiring lines disposed in the layered body 22 may be arranged in any manner. For example, each of the wiring lines may be disposed above the transistors 23, or each of the wiring lines may be disposed below the transistors 23.

Here, the element substrate 2 includes a plurality of transmissive regions A11 through which light is transmitted and a wiring region A12 that blocks light. The plurality of pixel electrodes 28 are disposed in a one-to-one manner with respect to the plurality of transmissive regions A11. Although not illustrated, the wiring region A12 has a lattice shape in plan view, and surrounds the transmissive regions A11. The plurality of transistors 23 and the various wiring lines are disposed in the wiring region A12.

The insulating layer 225 is disposed on the insulating layer 224. The insulating layer 225 has a recess 2251. The recess 2251 is a recess formed in a surface of the insulating layer 225 opposite from the insulating layer 224. The insulating layer 225 is a space-forming transmissive member that forms a space S together with the lens layer 25 to be described below.

Further, the layered body 22 has a plurality of contact holes H1. Each of the contact holes H1 is a hole extending through the insulating layer 224 and the insulating layer 225, and is formed along the thickness direction of the layered body 22. The plurality of contact holes H1 are disposed in a one-to-one manner with respect to the plurality of transistors 23. The contact hole H1 corresponding to the first transistor 23a is a "first contact hole H1a", and the contact hole H1 corresponding to the second transistor 23b is a "second contact hole H1b".

Each of materials of the insulating layers 221 to 225 is an inorganic material containing silicon, such as silicon oxide, for example. By using the inorganic material, it is easier to form a sufficiently thin layer that also has excellent optical properties, compared to a case in which a resin material is used. Further, the insulating layers 221 to 225 may include the same material as each other, or may include different materials. However, by using the same material, it is easier to form the layered body 22, and interface reflection is suppressed.

The lens layer 25 is disposed on the insulating layer 225 so as to cover the recess 2251. Due to the presence of the recess 2251, the space S is present between the insulating layer 225 and the lens layer 25. Here, a light-guiding portion 200 including the insulating layer 225, the space S, and the lens layer 25.

The lens layer 25 is transmissive and has insulating properties. The lens layer 25 includes a base 251 and a lens group 250. The lens group 250 includes a plurality of lenses 252. The plurality of lenses 252 are disposed in a one-to-one manner with respect to the plurality of transistors 23. The lens 252 corresponding to the first transistor 23a is a "first lens 252a", and the lens 252 corresponding to the second transistor 23b is a "second lens 252b".

The base 251 is a flat plate shaped portion of the lens layer 25 that extends over the X-Y plane. The base 251 is in contact with the insulating layer 225. Specifically, although not illustrated, a portion of the base portion 251 that is positioned on the outside of the lens group 250 in plan view is in contact with the insulating layer 225. Further, the pixel electrode group 280 is disposed on a surface of the base portion 251 opposite from the lens group 250.

Each of the lenses 252 is a convex lens that protrudes from the base portion 251 toward the bottom surface of the recess 2251. Each of the lenses 252 has a convex curved surface that is a lens surface. For example, when light is transmitted from the first base member 21 toward the pixel electrode group 280, the lens surface of each of the lenses 252 functions as an incident surface that causes the light to be incident from the space S toward the inside of the lens 252. Note that the shape of each of the lenses 252 is semi-spherical, but is not limited thereto, and may be any shape.

Each of the lenses 252 is not in contact with the bottom surface of the recess 2251, and is separated from the bottom surface of the recess 2251. Accordingly, each of the lenses 252 and the layered body 22 are disposed with the space S interposed therebetween. Thus, each of the first lens 252a and the second lens 252b, and the layered body 22 including the insulating layer 225 are disposed with the space S interposed therebetween. Causing the space S to be interposed between each of the lenses 252 and the layered body 22 can improve the lens performance, compared to a case in which each of the lenses 252 is in contact with the layered body 22. This is because a difference in the refractive index between each of the lenses 252 and the space S is greater than a difference in the refractive index between each of the lenses 252 and the layered body 22. Therefore, utilization efficiency of light can be increased due to the presence of the light-guiding portion 200. Further, due to the presence of the space S, the difference in the refractive index between each of the lenses 252 and the space S can be sufficiently increased without excessively increasing the refractive index of each of the lenses 252. As a result, it is possible to increase selectivity of the material of the lens layer 25.

Figure 5:
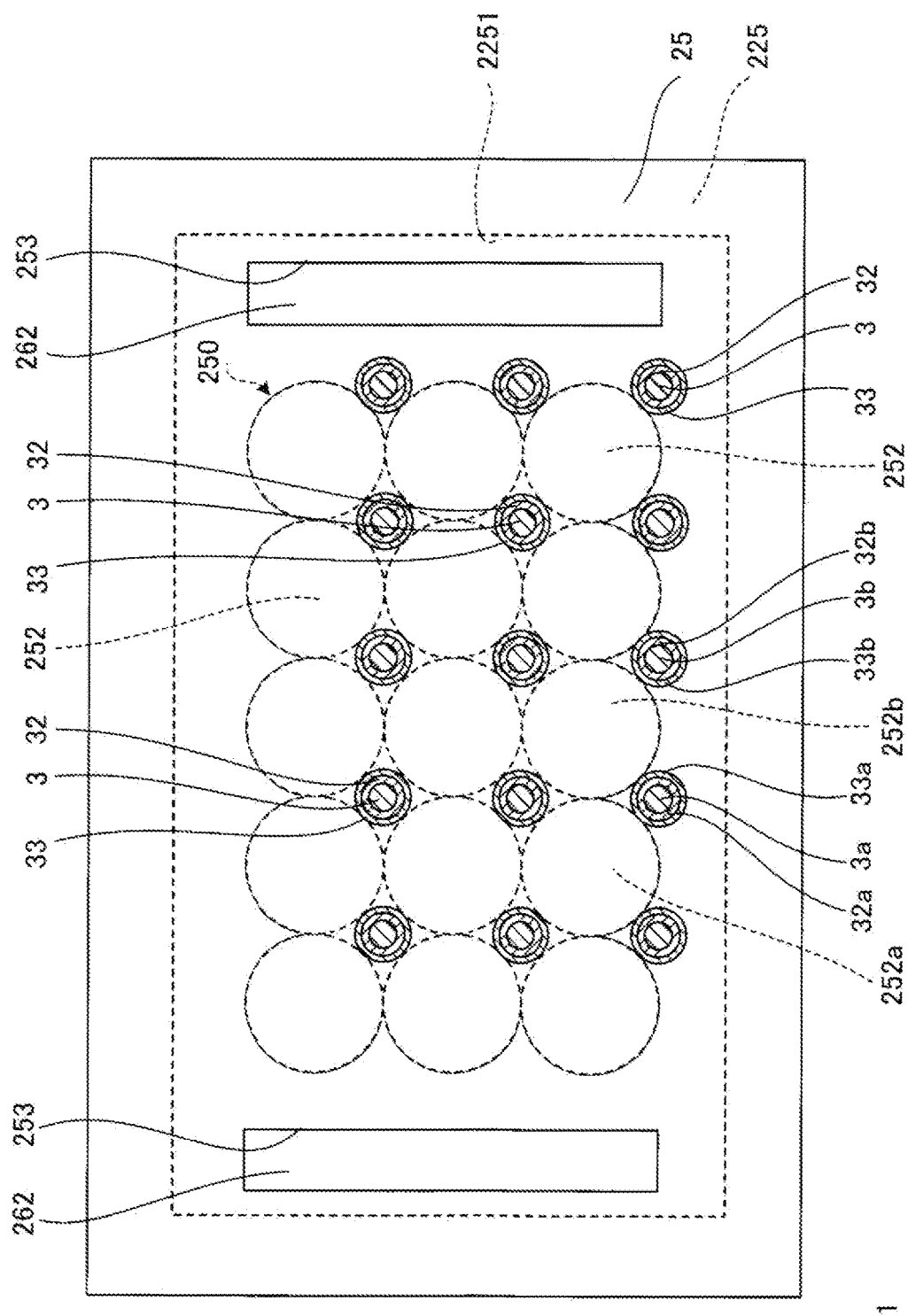
FIG. 5 is a plan view illustrating the element substrate.

Further, as illustrated in FIG. 5, the lens group 250 overlaps with the recess 2251 in plan view. The lens group 250 is contained in the recess 2251 in plan view. Note that the shape of the recess 2251 in plan view is a quadrangular shape, but may be a shape other than that. Further, the plurality of lenses 252 are arranged in a matrix pattern in the direction X1 and the direction Y1 in plan view. Note that the arrangement of the plurality of lenses 252 is not limited to the matrix pattern. Further, it is sufficient that the number of the lenses 252 be two or more, and is not limited to the number illustrated. Further, although not illustrated, the plurality of lenses 252 overlap with the plurality of pixel electrodes 28 in a one-to-one manner in plan view. Thus, the first lens 252a overlaps with the first pixel electrode 28a in plan view, and the second lens 252b overlaps with the second pixel electrode 28b in plan view.

As illustrated in FIG. 4, the lens layer 25 has a plurality of contact holes H2 and two through holes 253. Each of the contact holes H2 is a hole extending through the lens layer 25 and is formed along the thickness direction of the lens layer 25. The plurality of contact holes H2 are arranged in a one-to-one manner with respect to the plurality of contact holes H1. Although not illustrated, each of the contact holes H2 overlaps with the corresponding contact hole H1 in plan view. The contact hole H2 overlapping with the first contact hole H1a in plan view is a "third contact hole H2a", and the contact hole H2 overlapping with the second contact hole H1b in plan view is a "fourth contact hole H2b".

Each of the two through holes 253 is a hole extending through the lens layer 25 and is formed along the thickness direction of the lens layer 25. The thickness direction is the same as the direction Z1 or the direction Z2. As illustrated in FIG. 5, each of the through holes 253 overlaps with the recess 2251 in plan view. Each of the two through holes 253 is disposed at a position different from the plurality of contact holes H2 in plan view. Each of the through holes 253 is a hole used to form the space S. Thus, by providing each of the through holes 253 in the lens layer 25, the space S can be easily formed in the manufacturing method to be described below. Further, an opening area of each of the through holes 253 is larger than an opening area of each of the contact holes H2. Thus, the space S can be easily formed compared to a case in which the opening area of each of the contact holes H2 is larger than the opening area of each of the through holes 253. Additionally, as illustrated in FIG. 5, the two through holes 253 are positioned on both sides of the lens group 250 in plan view. In other words, the lens group 250 is positioned between the two through holes 253 in plan view. Therefore, the space S can be easily formed compared to a case in which there is the single through hole 253. Further, the space S can be easily formed compared to a case in which the two through holes 253 do not sandwich the lens group 250 in plan view.

Note that the number, shape, and arrangement of the through holes 253 are not limited to the illustrated example. For example, the number of the through holes 253 may be one, or three or more. For example, a plurality of the through holes 253 may be arranged to surround the lens group 250 in plan view. Further, the lens layer 25 need not necessarily have the two through holes 253, depending on the manufacturing method or the like.

The material of the lens layer 25 is not particularly limited, and includes an inorganic material containing silicon, such as silicon oxide and silicon oxynitride. Of these, the lens layer 25 is preferably mainly configured by silicon oxide. Note that the lens layer 25 may be configured by a resin material.

As illustrated in FIG. 4, the two light-transmitting portions 262 are disposed in the lens layer 25. The two light-transmitting portions 262 are disposed in a one-to-one manner with respect to the two through holes 253. Each of the light-transmitting portions 262 extends through the inside of the corresponding through hole 253 toward the bottom surface of the recess 2251. Each of the light-transmitting portions 262 is in contact with the bottom surface of the recess 2251. Each of the light-transmitting portions 262 fills in the corresponding through hole 253. Thus, each of the light-transmitting portions 262 blocks the corresponding through hole 253. In this way, the intrusion of foreign matter into the space S can be inhibited. As a result, it is possible to prevent the progress of the light passing through each of the lenses 252 from being inhibited by the foreign matter. Further, even when each of the through holes 253 is positioned inside the sealing member 8 illustrated in FIG. 1 in plan view, the liquid crystal material can be inhibited from entering the space S from the through holes 253.

In the present embodiment, because each of the through holes 253 is blocked, the space S described above is an airtight space. The space S includes a gas, such as air, or by a vacuum. Note that the space S need not necessarily be the airtight space. Further, each of the light-transmitting portions 262 need not necessarily fill in the corresponding through hole 253. For example, the light-transmitting portion 262 may be disposed covering the corresponding through hole 253 so as to block the through hole 253. Further, each of the through holes 253 need not necessarily be blocked. For example, in a case in which each of the through holes 253 is positioned outside the sealing member 8 illustrated in FIG. 1 in plan view, since there is no risk of intrusion of the liquid crystal material, each of the through holes 253 need not necessarily be blocked.

The material of each of the light-transmitting portions 262 is not particularly limited, and configured by an inorganic material containing silicon, such as silicon oxide and silicon oxynitride. Of these, the material of each of the light-transmitting portions 262 is preferably mainly configured by silicon oxide. Note that each of the light-transmitting portions 262 may be configured by a resin material. Further, each of the light-transmitting portions 262 is preferably configured by the same material as the material of the lens layer 25. By using the same material, interface reflection between the lens layer 25 and each of the light-transmitting portions 262 is suppressed.

As illustrated in FIG. 4, each of the contacts 3 has a columnar shape extending in the direction Z1. Each of the contacts 3 extends through the layered body 22 and the lens layer 25. Further, each of the contacts 3 includes a portion disposed in the space S.

The plurality of contacts 3 are disposed in a one-to-one manner with respect to the plurality of relay electrodes 249. Each of the contacts 3 is in contact with the corresponding relay electrode 249. Each of the contacts 3 electrically couples the transistor 23 and the pixel electrode 28. The contact 3 that electrically couples the first transistor 23a and the first pixel electrode 28a is a "first contact 3a". The contact 3 that electrically couples the second transistor 23b and the second pixel electrode 28b is a "second contact 3b". Further, one end of the first contact 3a is in contact with the first relay electrode 249a and the other end is in contact with the first pixel electrode 28a. One end of the second contact 3b is in contact with the second relay electrode 249b and the other end is in contact with the second pixel electrode 28b.

As described above, the lens layer 25 has the plurality of contact holes H2. Thus, the plurality of contacts 3 can be caused to extend through the lens layer 25. Since each of the contacts 3 extends through the lens layer 25, each of the contacts 3 includes the portion located in the space S. Thus, each of the contacts 3 includes a portion that extends through the lens layer 25 and the portion located in the space S. In other words, each of the contacts 3 passes through the lens layer 25 and the space S. Since each of the contacts 3 is disposed passing through the lens layer 25 and the space S, it is not necessary to route each of the contacts 3 to the outside of the lens group 250. Thus, the light-guiding portion 200 can be disposed between the plurality of transistors 23 and the pixel electrode group 280 without complicating the arrangement of each of the contacts 3. The element substrate 2 including the lens layer 25 having the excellent lens performance can be realized between the plurality of transistors 23 and the plurality of pixel electrodes 28.

Further, the plurality of contacts 3 are arranged in a one-to-one manner with respect to the plurality of lenses 252. As illustrated in FIG. 5, each of the contacts 3 is disposed at a different position, in plan view, to the corresponding lens 252. Thus, the first contact 3a and the first lens 252a are disposed at different positions in plan view. The second contact 3b and the second lens 252b are disposed at different positions in plan view. In this way, each of the contacts 3 is disposed so as not to overlap with the corresponding lens 252 in plan view. As a result, the light transmitted through each of the lenses 252 can be prevented from being obstructed by the corresponding contact 3. Further, each of the contacts 3 is disposed so as not to overlap with all of the lenses 252 in plan view. Therefore, it is possible to suppress the obstruction of the light by the plurality of contacts 3. Thus, a deterioration in the utilization efficiency of the light can be suppressed.

Note that a portion of the contact 3 and a portion of the lens 252 may overlap in plan view. Further, although not illustrated, each of the contacts 3 overlaps with the corresponding relay electrode 249 in plan view. Thus, the first contact 3a overlaps with the first relay electrode 249a, and the second contact 3b overlaps with the second relay electrode 249b.

Further, as described above, each of the contacts 3 extends through the layered body 22 and the lens layer 25. In other words, each of the contacts 3 includes a portion disposed in the contact hole H1 and a portion disposed in the contact hole H2. Thus, the first contact 3a includes a portion disposed in the first contact hole H1a and a portion disposed in the third contact hole H2a. The second contact 3b includes a portion disposed in the second contact hole H1b and a portion disposed in the fourth contact hole H2b. Since each of the contacts 3 includes the portion disposed in the contact hole H1 of the layered body 22, even when each of the relay electrodes 249 is disposed inside the layered body 22 as described above, it is not necessary to route each of the contacts 3 to the outside of the lens layer 25. Thus, the insulating layer 225 forming the space S can be favorably disposed between the plurality of transistors 23 and the pixel electrode group 280.

Note that each of the relay electrodes 249 may be disposed at the layered body 22. In that case, the layered body 22 need not necessarily have each of the contact holes H1.

Examples of the constituent material of each of the contacts 3 include metals such as tungsten, cobalt (Co), and copper (Cu), metal materials such as metal nitrides and metal silicides, and the like. Of these, it is preferable that each of the contacts 3 mainly contains tungsten. Specifically, each of the contacts 3 preferably includes a tungsten plug. Thus, each of the first contact 3a and the second contact 3b preferably includes the tungsten plug. By using tungsten, the high-precision columnar contact 3 can be easily formed. In addition, since each of the contacts 3 includes the tungsten plug, an arrangement space of each of the contacts 3 can be made smaller than in a case in which each of the contacts 3 has a so-called trench. In this way, it is possible to suppress a plan view shape of the lens 252 from being made smaller in order to arrange each of the contacts 3. Thus, a deterioration in an opening ratio can be suppressed.

Note that the tungsten plug includes not only a plug configured by tungsten alone, but also a plug having tungsten as a main component. Thus, the tungsten plug can be configured by a plurality of layers, for example. For example, the tungsten plug may be a layered structure of a layer primarily formed of tungsten and a layer including tungsten nitride.

As illustrated in FIG. 4, the plurality of inorganic material films 32 are disposed in a one-to-one manner with respect to the plurality of contacts 3. Each of the inorganic material films 32 is in contact with an outer circumferential surface of the corresponding contact 3. In the present embodiment, as illustrated in FIG. 5, each of the inorganic material films 32 surrounds a side surface of the outer circumferential surface. Further, as illustrated in FIG. 4, each of the inorganic material films 32 extends through the insulating layer 225 and the lens layer 25. Further, each of the inorganic material films 32 includes an inorganic material containing silicon.

Here, the inorganic material film 32 in contact with the outer circumferential surface of the first contact 3a is a "first inorganic material film 32a", and the inorganic material film 32 in contact with the outer circumferential surface of the second contact 3b is a "second inorganic material film 32b". Each of the first inorganic material film 32a and the second inorganic material film 32b includes the inorganic material containing silicon. Examples of the inorganic material include silicon oxide, such as silicon dioxide. By disposing each of the inorganic material films 32 on the corresponding outer circumferential surface of the contact 3, the plurality of contacts 3 can be protected during manufacture of the element substrate 2. Thus, the plurality of contacts 3 can be reliably and easily formed. As a result, the risk of an electrical coupling failure occurring between each of the transistors 23 and the corresponding pixel electrode 28 can be suppressed.

As illustrated in FIG. 4, the plurality of protective portions 33 are disposed in a one-to-one manner with respect to the plurality of contacts 3. The inorganic material film 32 is disposed between each of the protective portions 33 and the corresponding contact 3. Thus, each of the contacts 3 is protected by two layers of the inorganic material film 32 and the protective portion 33. Of the plurality of protective portions 33, the protective portion 33 corresponding to the first contact 3a is a "first protective portion 33a", and, of the plurality of 33 protective portions 33, the protective portion 33 corresponding to the second contact 3b is a "second protective portion 33b".

Each of the protective portions 33 includes a protective film 331 and a protective film 332. Of the plurality of protective films 331, the protective film 331 corresponding to the first contact 3a is a "first film 331a", and, of the plurality of protective films 331, the protective film 331 corresponding to the second contact 3b is a "second film 331b". Further, of the plurality of protective films 332, the protective film 332 corresponding to the first contact 3a is a "third film 332a", and, of the plurality of protective films 332, the protective film 332 corresponding to the second contact 3b is a "fourth film 332b".

Each of the protective portions 33 includes an inorganic material different from each of the material of the lens layer 25 and the material of the layered body 22. Specifically, examples of the material of each of the protective portions 33 include silicon, metal nitrides, and the like. Examples of the metal nitride include titanium nitride, tungsten nitride, and the like. Note that the plurality of protective films 331 and the plurality of protective films 332 are the same material.

Each of the protective films 331 is in contact with a wall surface of the corresponding contact hole H1. Thus, the first film 331a is in contact with the wall surface of the first contact hole H1a, and the second film 331b is in contact with the wall surface of the second contact hole H1b. Each of the protective films 331 is positioned on the outside of the corresponding contact 3 so that the plurality of contacts 3 can be protected during the manufacture of the element substrate 2. Therefore, the plurality of contacts 3 extending through the insulating layer 225 can be reliably and easily formed. Further, each of the contact holes H1 extends through the protective film 331 and is in contact with the relay electrode 249. Thus, the first contact 3a extends through the first film 331a and is in contact with the first relay electrode 249a. Similarly, the second contact 3b extends through the second film 331b and is in contact with the second relay electrode 249b. Therefore, conduction between each of the contacts 3 and the corresponding relay electrode 249 can be reliably and stably secured.

Further, each of the protective films 332 is in contact with the corresponding contact hole H2. Thus, the third film 332a is in contact with the third contact hole H2a, and the fourth film 332b is in contact with the fourth contact hole H2b. Each of the protective films 332 is positioned on the outside of the corresponding contact 3 so that the plurality of contacts 3 can be protected during the manufacture of the element substrate 2.

Note that a film other than the inorganic material film 32 may be interposed between each of the protective portions 33 and the corresponding contact 3.

The element substrate 2 is configured as described above.

Figure 25:
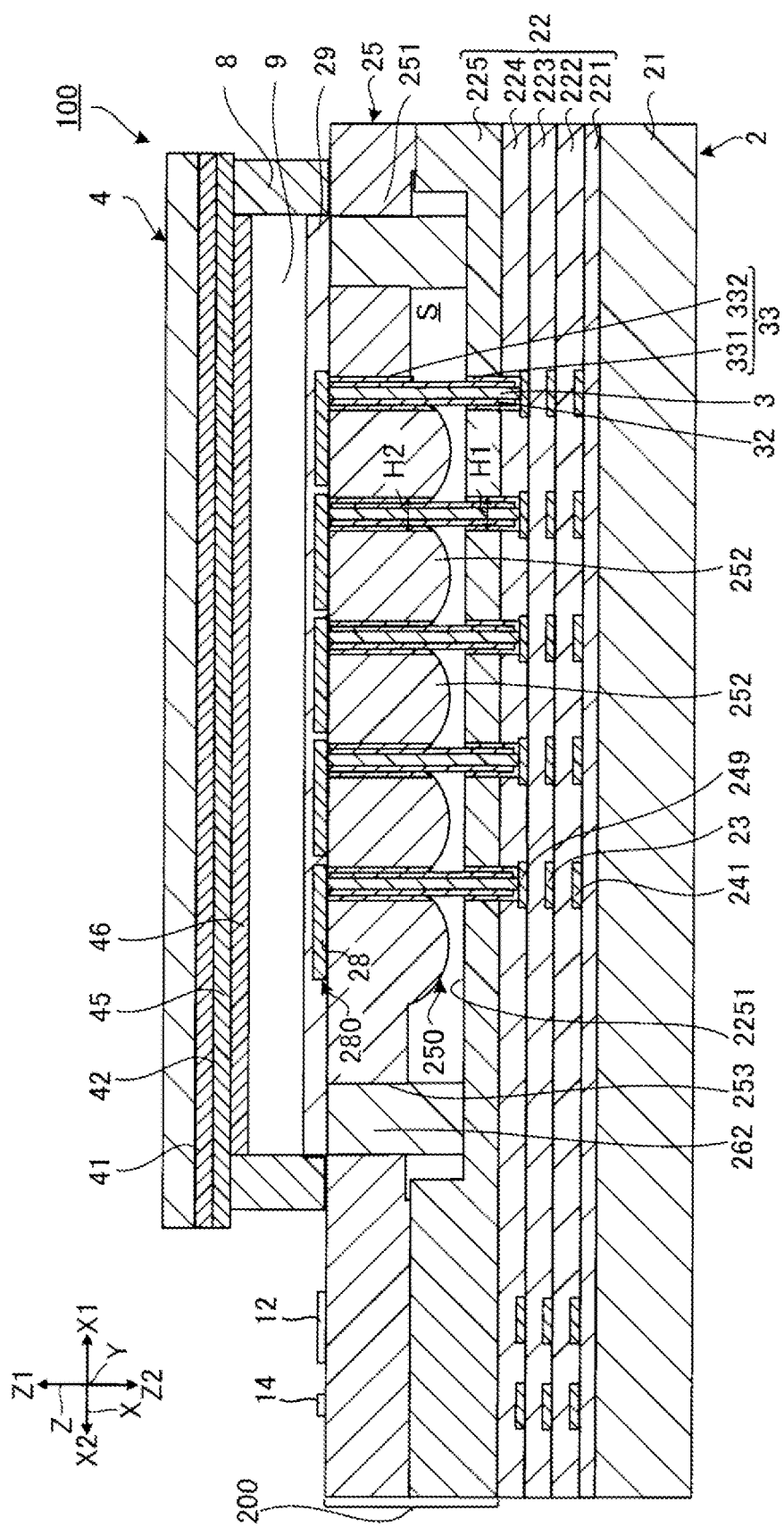
FIG. 25 is a cross-sectional view taken along the line A-A in FIG. 1 of the electro-optical device according to the first embodiment.

FIG. 25 is a cross-sectional view, taken along the line A-A in FIG. 1, of the electro-optical device 100 according to the first embodiment. As illustrated in FIG. 25, in the present embodiment, the light-guiding portion 200 is provided that includes the plurality of lenses 252 between the plurality of transistors 23 of the element substrate 2 and the pixel electrode group 280, but the counter substrate 4 described above is not provided with an optical member that converges or disperses light. However, since the element substrate 2 includes the plurality of lenses 252 described above, the utilization efficiency of the light can be sufficiently increased even when the counter substrate 4 is not provided with the optical member. Thus, the bright electro-optical device 100 can be realized.

Furthermore, the counter substrate 4 does not include a light-blocking film in the display region A10. In other words, the counter substrate 4 does not include a black matrix, which is a light-shielding film, at a position corresponding to a position between the pixel electrode 28 and the pixel electrode 28 of the element substrate 2 in plan view. By adopting such a configuration, a phase difference due to diffraction by the black matrix does not occur when the light emitted from the counter substrate 4 passes through the counter substrate 4, and a disturbance in a polarization state is not caused to occur. Thus, a deterioration in contrast can be suppressed. Further, when the counter substrate 4 and the element substrate 2 are combined, there is no so-called "combination misalignment" between the black matrix of the counter substrate 4 and the light-shielding film 241 of the element substrate 2, and thus, brightness is not reduced as a result of a deterioration in the opening ratio of the pixels P.

By combining the counter substrate 4 and the element substrate 2 of the first embodiment in this way, it is possible to realize the bright electro-optical device 100 offering high contrast. In particular, when the electro-optical device 100 is disposed so as to cause the light to enter from the element substrate 2 side and be emitted from the counter substrate 4 side, the polarization state of the light modulated by the liquid crystal layer 9 is not disturbed by the black matrix when passing through the counter substrate 4, and thus the contrast performance of the electro-optical device 100 can be further enhanced.

Figure 26:
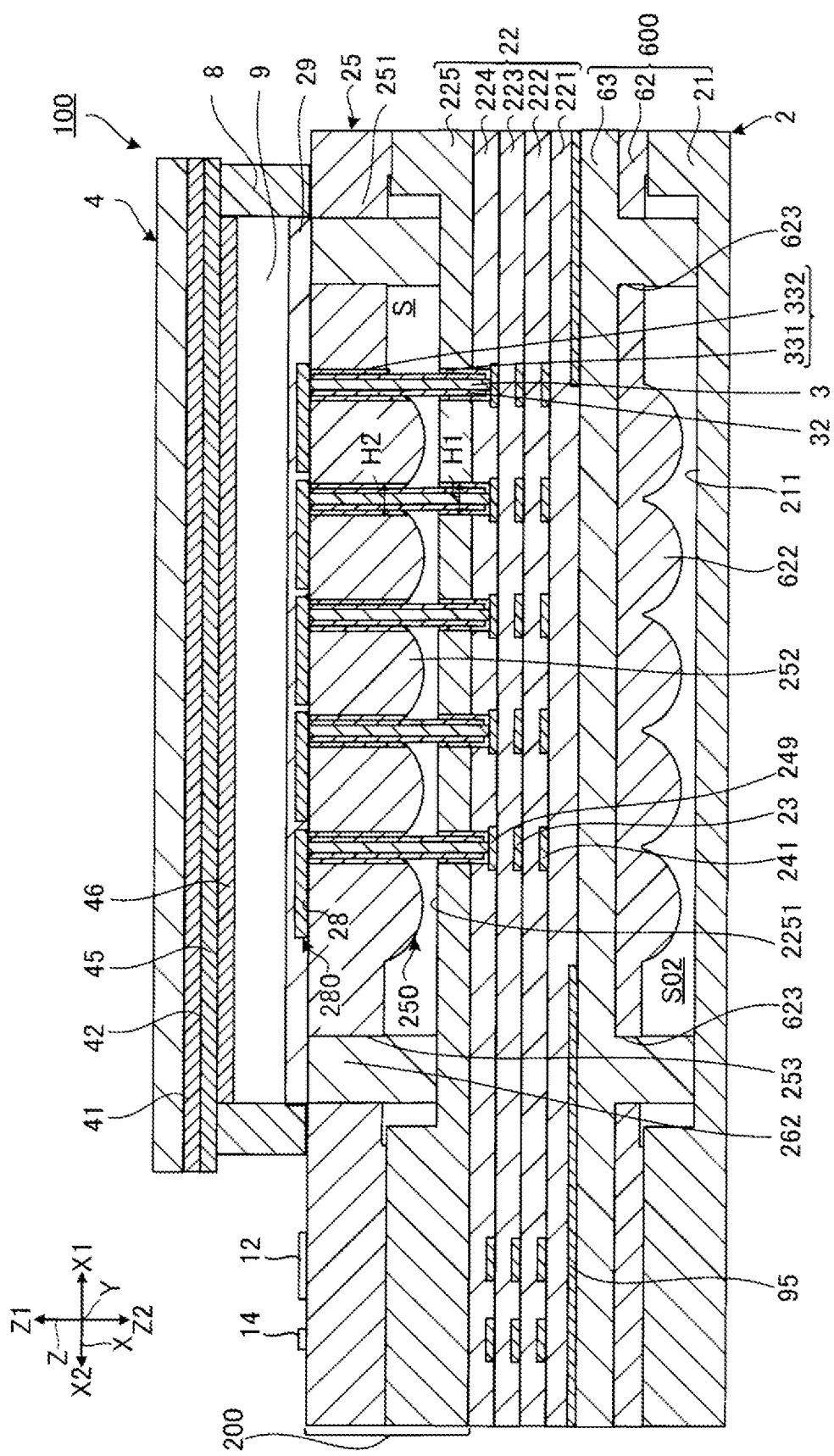
FIG. 26 is an cross-sectional view of the electro-optical device according to a first modified example of the first embodiment.
Figure 27:
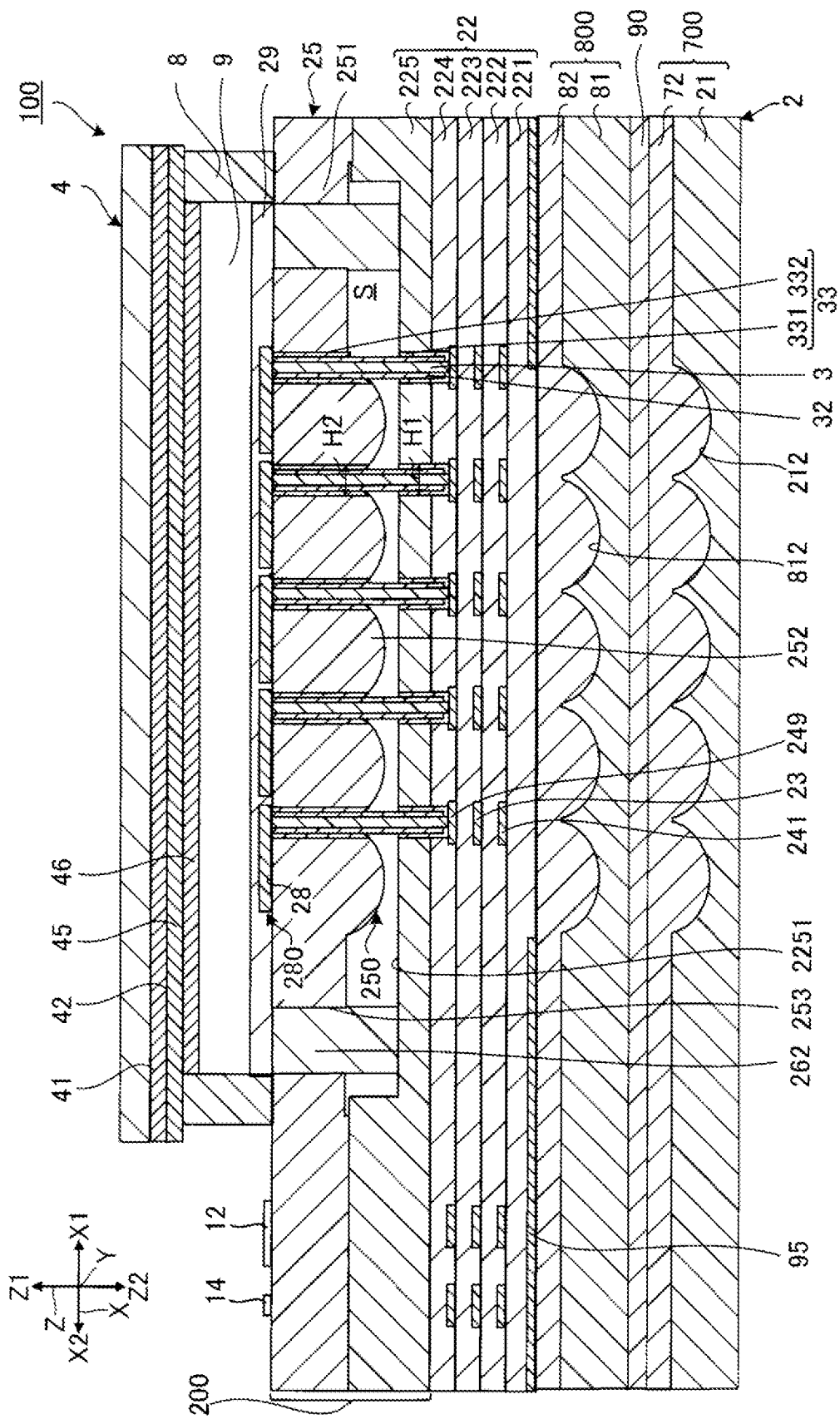
FIG. 27 is an explanatory diagram of the electro-optical device according to a second modified example of the first embodiment.

Further, as illustrated in FIG. 26 and FIG. 27, the element substrate 2 of the electro-optical device 100 according to the first embodiment may further include a light-guiding portion having a plurality of lenses between the layered body 22 and the first base member 21, for example. In this way, by disposing the light-guiding portion on the light-incident side and the light emitting side of the plurality of transistors 23, the utilization efficiency of the light can be further increased, and, as a result, the brighter electro-optical device 100 can be realized.

FIG. 26 is a cross-sectional view of the electro-optical device 100 according to a first modified example of the first embodiment, illustrating a cross section taken along the line A-A in FIG. 1. The first modified example differs from the example illustrated in FIG. 4 in that a light-guiding portion 600 is included on a side of the lens layer 25 opposite from the layered body 22. In other respects, the configuration is the same as that of the example illustrated in FIG. 4. Further, the light-guiding portion 600 differs from the light-guiding portion 200 in that the light-guiding portion 600 does not include the contacts 3 and the configuration relating thereto. In other respects, the light-guiding portion 600 has the same configuration as the light-guiding portion 200. The first base member 21 includes a recess 211, and a lens layer 62 is disposed so as to cover the recess 211. The lens layer 62 includes a plurality of lenses 622. Due to the presence of the recess 211, a space S02 is present between the first base member 21 and the lens layer 62. The space S02 is an airtight space in the same manner as the space S, and the interior of the space S02 includes a gas such as air, or a vacuum. Note that the space S02 need not necessarily be the airtight space. Here, the light-guiding portion 600 includes the first base member 21, the space S02, the lens layer 62, and a light-transmitting portion 63. The light-transmitting portion 63 is transmissive. The light-transmitting portion 63 is disposed on the lens layer 62 and inside two through holes 623 provided in the lens layer 62. The light-transmitting portion 63 has two portions that extend into the through holes 623 and toward the bottom surface of the recess 211. Each of the two portions of the light-transmitting portion 63 is in contact with the bottom surface of the recess 211. The two portions of the light-transmitting portion 63 respectively fill in the corresponding through holes 623. Accordingly, the light-transmitting portion 63 blocks the through holes 623. Further, a peripheral light-shielding film 95 disposed in the peripheral region A20 is disposed on the insulating layer 221. The peripheral light-shielding film 95 has a quadrangular frame shape, for example.

FIG. 27 is a cross-sectional view of the electro-optical device 100 according to a second modified example of the first embodiment, illustrating a cross section taken along the line A-A in FIG. 1. The second modified example differs from the example illustrated in FIG. 4 in that a light-guiding portion 700 and a light-guiding portion 800 are included on the side of the lens layer 25 opposite from the layered body 22. In other respects, the configuration is the same as that of the example illustrated in FIG. 4. The light-guiding portion 700 includes the first base member 21, and a lens layer 72 formed so as to fill a plurality of recesses 212. The lens layer 72 is formed from a transmissive inorganic material having a different refractive index from the first base member 21. The light-guiding portion 800 includes an insulating layer 81 provided with a plurality of recesses 812, and a lens layer 82 formed so as to fill the plurality of recesses 812. The insulating layer 81 is formed from a transmissive inorganic material having substantially the same refractive index as the lens layer 72. The lens layer 82 is formed from a transmissive inorganic material having a different refractive index from the insulating layer 81. A light-transmitting layer 90 is disposed between the light-guiding portion 700 and the light-guiding portion 800. The light-transmitting layer 90 is formed from a transmissive inorganic material having substantially the same refractive index as the lens layer 72 and the insulating layer 81.

Note that the counter substrate 4 may be configured to include an optical member that converges or disperses light.

1D. Manufacturing Method for Electro-Optical Device 100

Figure 6:
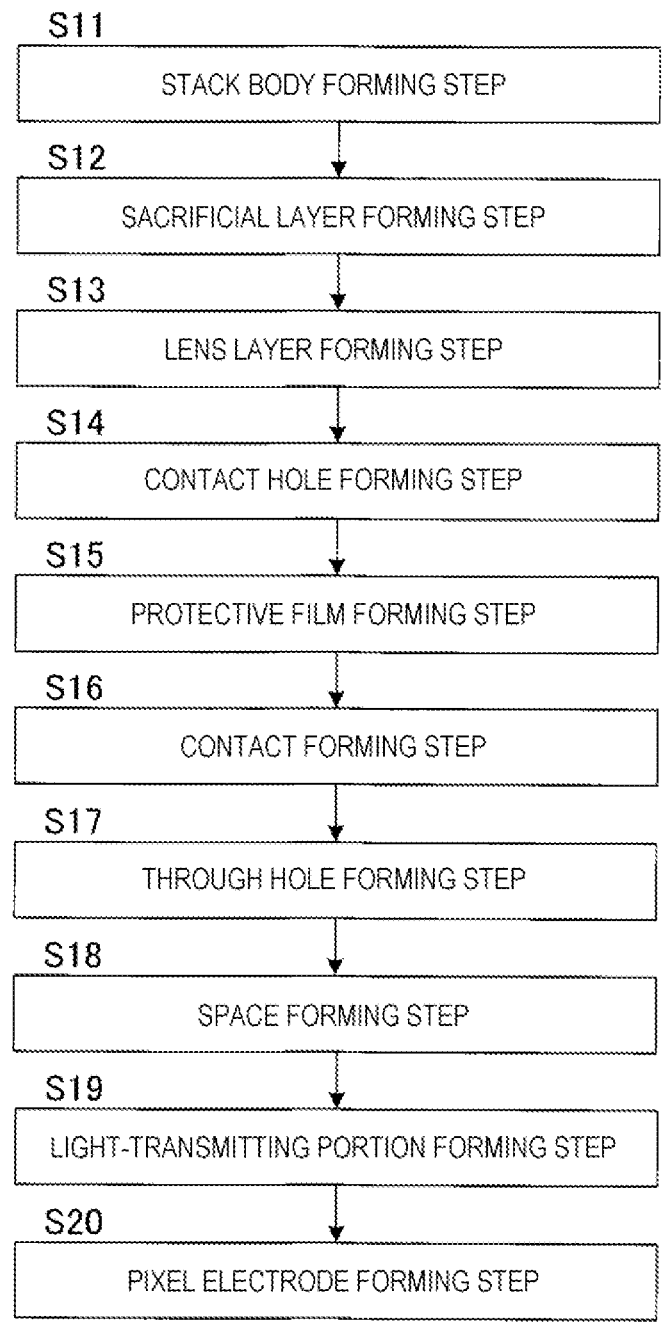
FIG. 6 is a diagram illustrating a flow of a manufacturing method for the electro-optical device according to the first embodiment.

FIG. 6 is a diagram illustrating a flow of a manufacturing method for the electro-optical device 100 according to the first embodiment. In FIG. 6, of manufacturing steps of the electro-optical device 100, mainly, manufacturing steps of the light-guiding portion 200 and the plurality of pixel electrodes 28 included in the element substrate 2 are illustrated. Note that the structure of the electro-optical device 100 other than the light-guiding portion 200 and the plurality of pixel electrodes 28 is manufactured by a known method, for example.

As illustrated in FIG. 6, the manufacturing method for the electro-optical device 100 includes a layered body forming step S11, a sacrificial layer forming step S12, a lens layer forming step S13, a contact hole forming step S14, a protective film forming step S15, a contact forming step S16, a through hole forming step S17, a space forming step S18, a light-transmitting portion forming step S19, and a pixel electrode forming step S20. Each of the steps will be described below in order.

Figure 7:
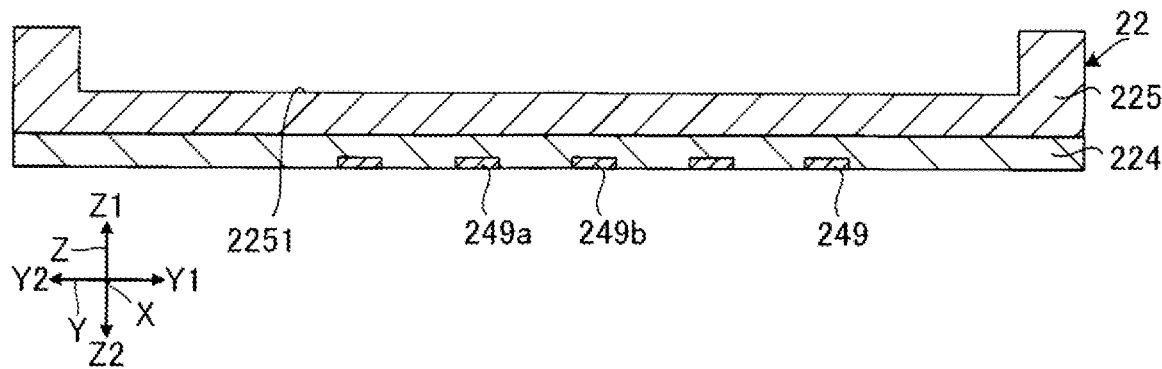
FIG. 7 is a cross-sectional view for describing a layered body formation forming step.

FIG. 7 is a cross-sectional view for describing the layered body forming step S11. As illustrated in FIG. 7, in the layered body forming step S11, the layered body 22 including the plurality of insulating layers 221 to 225 is formed. Note that in FIG. 7, illustration of the insulating layers 221 to 223 is omitted. Each of the insulating layers 221 to 225 is formed by thermal oxidation or chemical vapor deposition (CVD), for example. Further, the recess 2251 is formed in the insulating layer 225. The recess 2251 is formed by dry etching or wet etching, for example. The recess 2251 is formed such that the depth of the recess 2251 is greater than the thickness of each of the lenses 252 formed in the step described below.

In the layered body forming step S11, the plurality of relay electrodes 249 are formed together with the formation of the layered body 22. Further, although not illustrated, in the layered body forming step S11, the plurality of light-shielding films 241, the plurality of transistors 23, the various wiring lines, and the like are formed. Thus, in the layered body forming step S11, the first transistor 23a and the second transistor 23b described above are formed together with the layered body 22. Note that each of the various wiring lines and the plurality of transistors 23 are formed by forming a metal film using a sputtering method or a vapor deposition method, and then performing etching using a resist mask on the metal film, for example.

Figure 8:
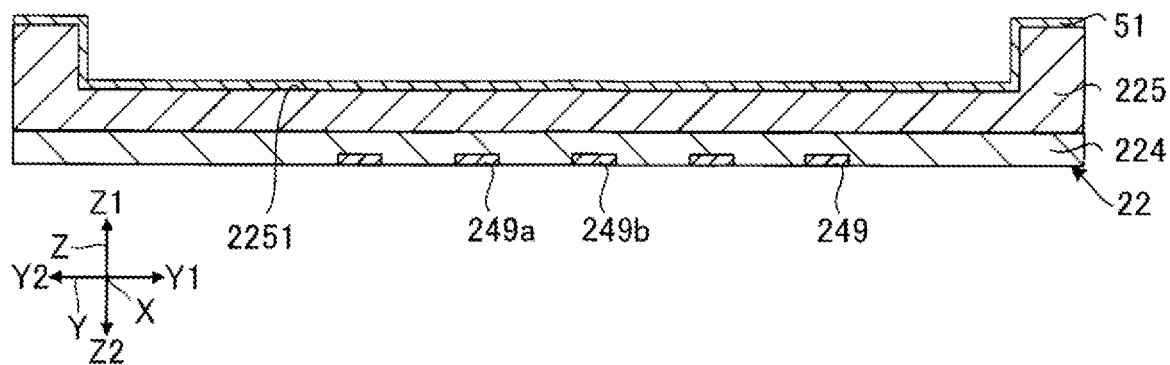
FIG. 8 is a cross-sectional view for describing a sacrificial layer forming step.
Figure 9:
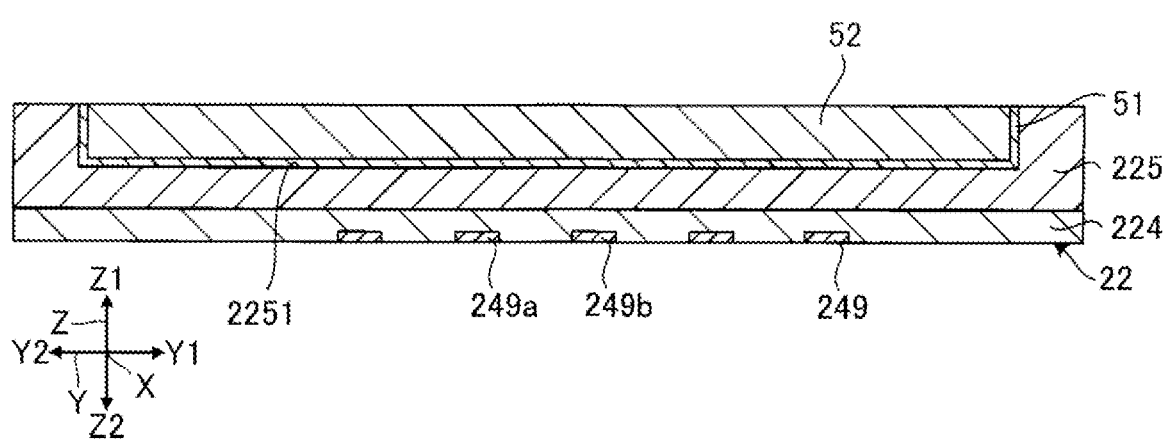
FIG. 9 is a cross-sectional view for describing the sacrificial layer forming step.
Figure 10:
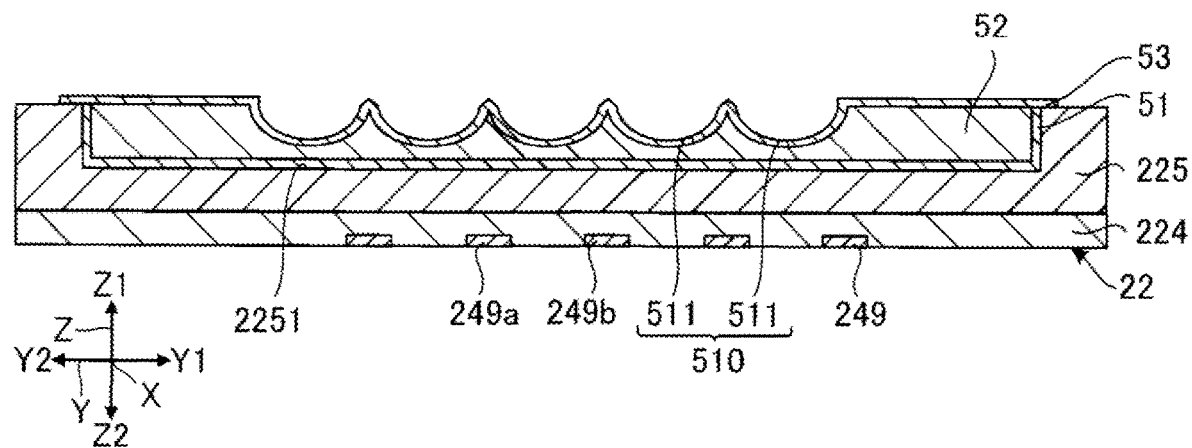
FIG. 10 is a cross-sectional view for describing the sacrificial layer forming step.

Each of FIG. 8, FIG. 9, and FIG. 10 is a cross-sectional view for describing the sacrificial layer forming step S12. In the sacrificial layer forming step S12, first, as illustrated in FIG. 8, a first sacrificial layer 51 is formed on the insulating layer 225. The first sacrificial layer 51 is formed so as to cover the surface of the recess 2251. The first sacrificial layer 51 is formed by a vapor deposition method such as CVD, for example. The first sacrificial layer 51 includes an inorganic material such as silicon. Further, the first sacrificial layer 51 may include an inorganic material other than silicon, such as a metal nitride such as titanium nitride, for example.

Next, as illustrated in FIG. 9, a second sacrificial layer 52 is formed on the first sacrificial layer 51, and after that, a flattening treatment is performed on the first sacrificial layer 51 and the second sacrificial layer 52. Further, the second sacrificial layer 52 is formed by a vapor deposition method such as CVD, for example. Examples of the flattening treatment include polishing treatments, such as chemical mechanical polishing (CMP), for example. The second sacrificial layer 52 includes a silicon based inorganic material such as silicon oxide, for example. The second sacrificial layer 52 is preferably a different material from the first sacrificial layer 51.

Next, as illustrated in FIG. 10, a recess group 510 including a plurality of lens recesses 511 is formed in the surface of the second sacrificial layer 52. After that, a third sacrificial layer 53 is formed on the second sacrificial layer 52. The formation of the plurality of lens recesses 511 is performed by etching, for example. The plurality of lens recesses 511 are indentations formed in the second sacrificial layer 52 in order to form the plurality of lenses 252 described below. The curved surface of each of the lens recesses 511 has a curved shape. Although not illustrated, the plurality of lens recesses 511 are arranged in a matrix pattern along the direction X1 and the direction Y1 in plan view. Further, although not illustrated, the recess group 510 overlaps with the recess 2251 in plan view. Further, the third sacrificial layer 53 is formed so as to cover the recess group 510. Thus, the shape of the surface of the third sacrificial layer 53 has a shape that follows the surface of each of the lens recesses 511. The third sacrificial layer 53 is formed by a vapor deposition method such as CVD, for example. The third sacrificial layer 53 includes an inorganic material such as silicon. Further, the third sacrificial layer 53 may include an inorganic material other than silicon, such as a metal nitride such as titanium nitride, for example. The third sacrificial layer 53 is preferably the same material as the first sacrificial layer 51.

Figure 11:
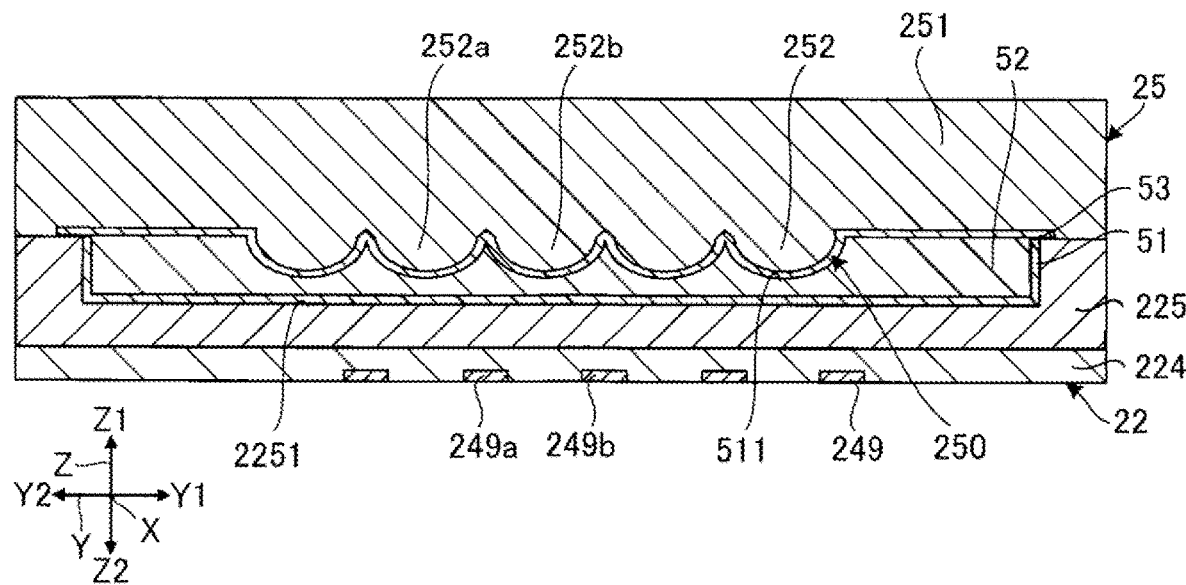
FIG. 11 is a cross-sectional view for describing a lens layer forming step.

FIG. 11 is a cross-sectional view for describing the lens layer forming step S13. In the lens layer forming step S13, the lens layer 25 is formed on the third sacrificial layer 53, as illustrated in FIG. 11. The lens layer 25 includes, for example, silicon oxide and the like. The lens layer 25 is formed by a vapor deposition method such as CVD, for example. The lens layer 25 is formed so as to fill indentations in the surface of the third sacrificial layer 53. As described above, the shape of the surface of the third sacrificial layer 53 has a shape that follows the surface of each of the lens recesses 511. In this way, by forming the lens layer 25 on the third sacrificial layer 53, the lens group 250 including the plurality of lenses 252 is formed on the lens layer 25. Thus, in the lens layer forming step S13, the lens layer 25 including the first lens 252a and the second lens 252b is formed.

Figure 12:
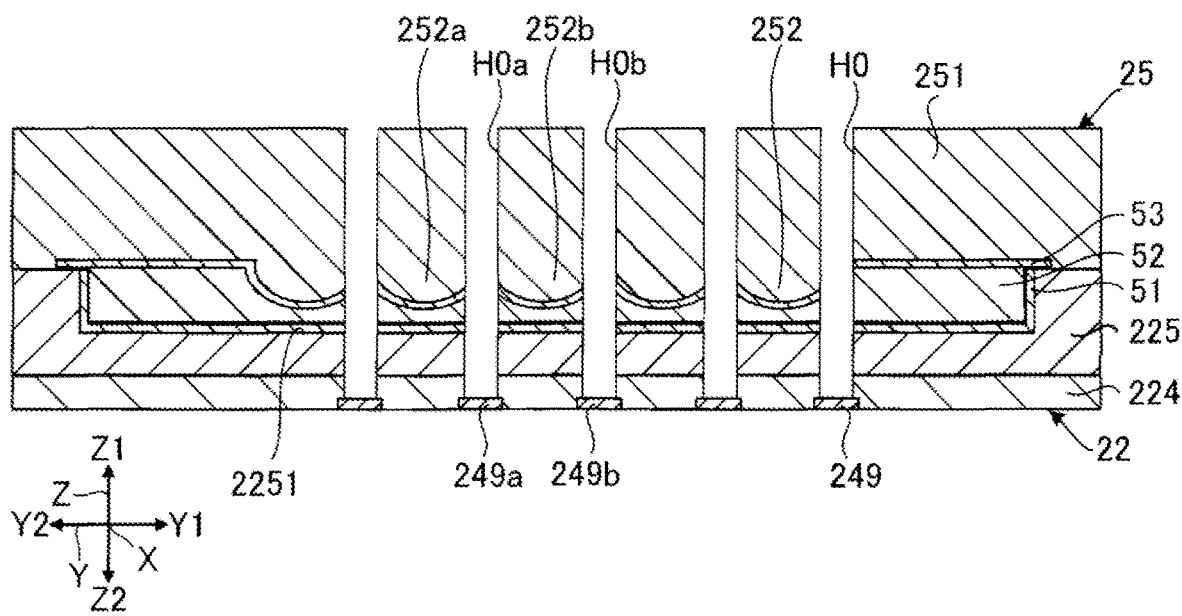
FIG. 12 is a cross-sectional view for describing a contact hole forming step.

FIG. 12 is a cross-sectional view for describing the contact hole forming step S14. In the contact hole forming step S14, as illustrated in FIG. 12, a plurality of contact holes H0 are formed extending through the layered body 22, the lens layer 25, the first sacrificial layer 51, the second sacrificial layer 52, and the third sacrificial layer 53. Each of the contact holes H0 is formed by etching. The plurality of contact holes H0 are formed in a one-to-one manner with respect to the plurality of lenses 252. Although not illustrated, each of the contacts hole H0 is formed at a different position, in plan view, to the corresponding lens 252. Further, the plurality of contact holes H0 are formed in a one-to-one manner with respect to the plurality of relay electrodes 249. Although not illustrated, each of the contact holes H0 overlaps with the corresponding relay electrode 249 in plan view. Further, each of the contact holes H0 is formed so as to expose the corresponding relay electrode 249.

Here, the contact hole H0 corresponding to the first lens 252a is a "first hole H0a", and the contact hole H0 corresponding to the second lens 252b is a "second hole H0b". Thus, in the contact hole forming step S14, the first hole H0a extending through the lens layer 25, the first sacrificial layer 51, the second sacrificial layer 52, and the third sacrificial layer 53, and the second hole H0b extending through the lens layer 25, the first sacrificial layer 51, the second sacrificial layer 52, and the third sacrificial layer 53 are formed.

Figure 13:
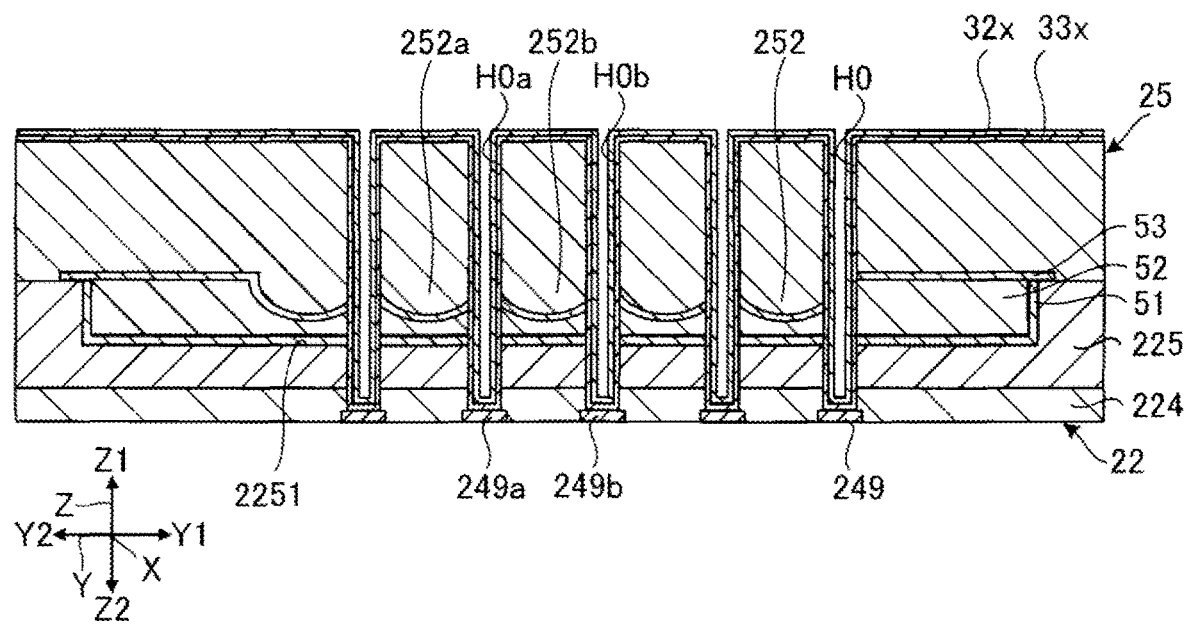
FIG. 13 is a cross-sectional view for describing a protective film forming step.
Figure 14:
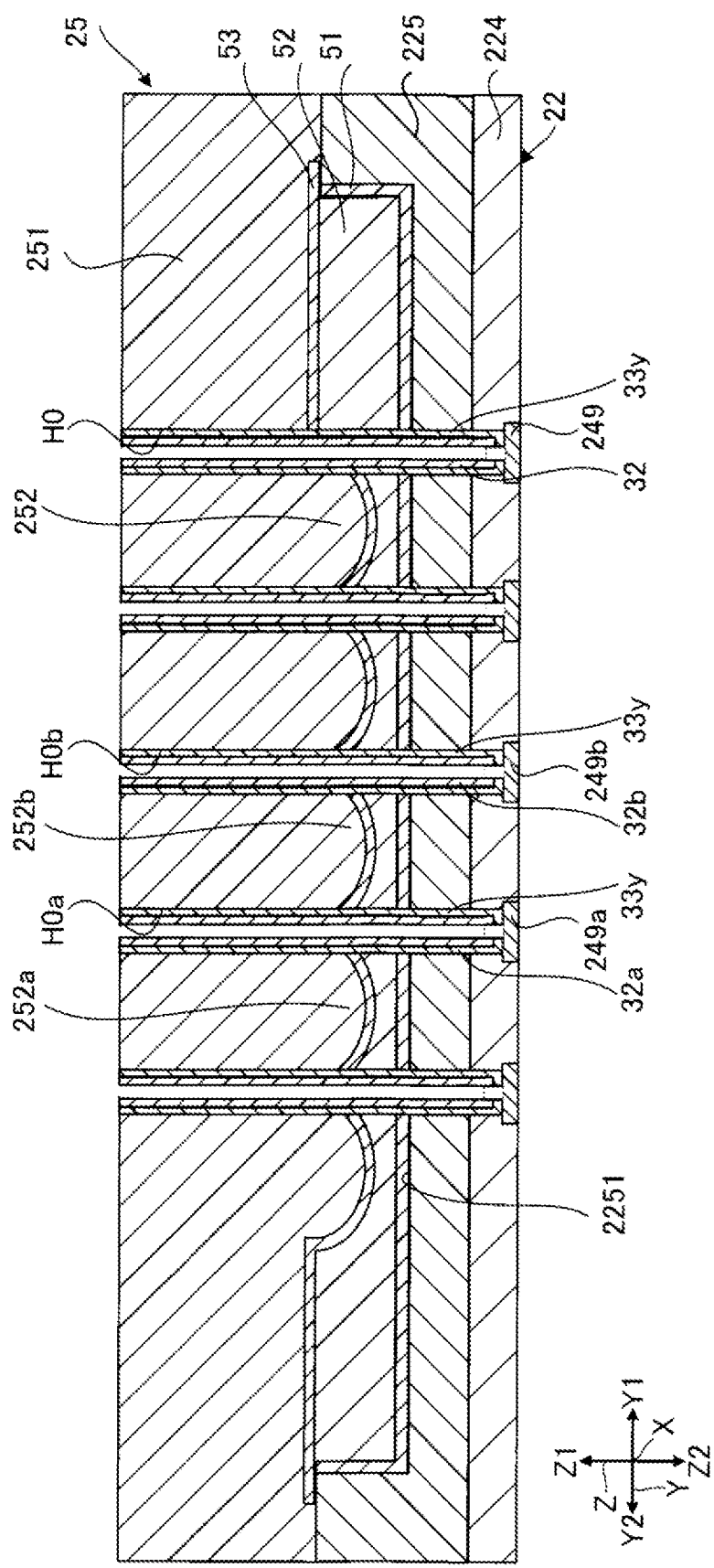
FIG. 14 is a cross-sectional view for describing the protective film forming step.

FIG. 13 and FIG. 14 are cross-sectional views for describing the protective film forming step S15. In the protective film forming step S15, first, as illustrated in FIG. 13, a first material film 33x is formed on the lens layer 25, and a second material film 32x is formed on the first material film 33x. By going through the following process, the first material film 33x becomes the plurality of protective portions 33. By going through the following process, the second material film 32x becomes the plurality of inorganic material films 32. The first material film 33x is formed of a material different from each of the material of the lens layer 25 and the material of the layered body 22. Specific examples of the material of the first material film 33x include silicon and metal nitrides. The second material film 32x is formed from an inorganic material containing silicon, such as silicon oxide. Further, each of the plurality of first material films 33x and the plurality of second material films 32x has a portion located within the plurality of contact holes H0. The first material film 33x is in contact with a wall surface of the plurality of contact holes H0. Therefore, the first material film 33x is disposed on the surface of the plurality of relay electrodes 249. In addition, the second material film 32x is in contact with the first material film 33x.

The first material film 33x is formed by CVD or the like, for example. The second material film 32x is formed by atomic layer deposition (ALD), for example. In each of the formation of the first material film 33x and the second material film 32x, the first material film 33x and the second material film 32x are preferably formed without using thermal CVD. By not using thermal CVD, damage to various wiring lines or the like disposed in the layered body 22 can be suppressed.

Next, as illustrated in FIG. 14, a plurality of first material films 33y are formed by removing portions of the first material film 33x. Further, as illustrated in FIG. 14, the plurality of inorganic material films 32 are formed by removing portions of the second material film 32x. Thus, by removing the portions of the second material film 32x, the first inorganic material film 32a and the second inorganic material film 32b are formed. Further, the portions of the first material film 33x and the portions of the second material film 32x are removed by etching back using anisotropic plasma etching (RIE), for example. Further, by removing portions of the first material film 33x and portions of the second material film 32x, the surface of the plurality of relay electrodes 249 is exposed.

Figure 15:
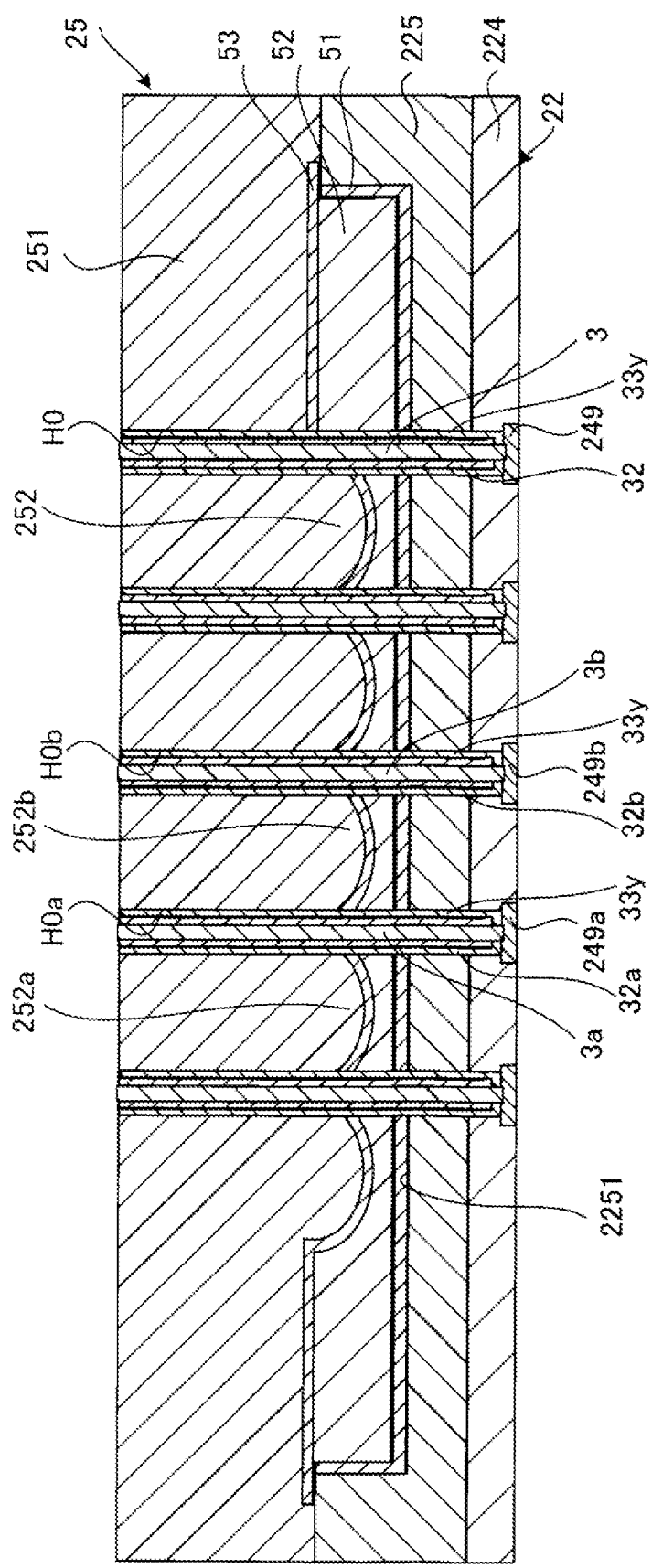
FIG. 15 is a cross-sectional view for describing a contact forming step.

FIG. 15 is a cross-sectional view for describing the contact forming step S16. In the contact forming step S16, the plurality of contacts 3 are formed, as illustrated in FIG. 15. The plurality of contacts 3 are formed in a one-to-one manner with respect to the plurality of contact holes H0. The first contact 3a is disposed in the first hole H0a, and the second contact 3b is disposed in the second hole H0b. Further, each of the contact holes H0 is filled by the corresponding contact 3. Therefore, each of the contacts 3 is coupled to the corresponding relay electrode 249. As a result, each of the contacts 3 is electrically coupled to the corresponding transistor 23. Further, each of the contacts 3 is in contact with the corresponding inorganic material film 32. Each of the contacts 3 is formed by plasma CVD or physical vapor deposition (PVD), for example.

Figure 16:
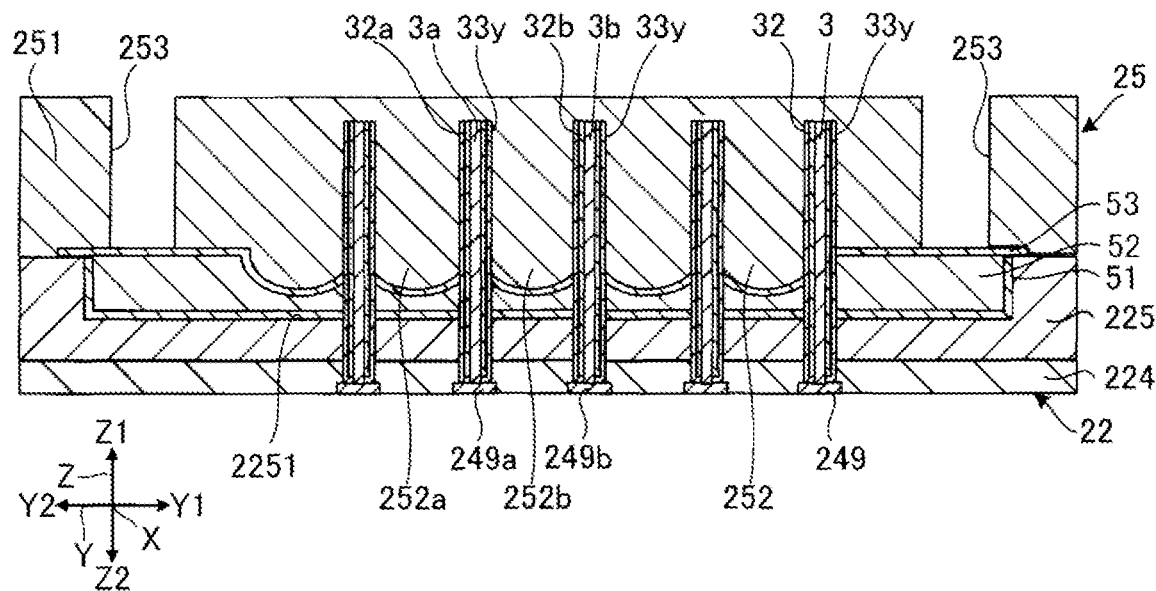
FIG. 16 is a cross-sectional view for describing a through hole forming step.

FIG. 16 is a cross-sectional view for describing the through hole forming step S17. In the through hole forming step S17, as illustrated in FIG. 16, portions of the lens layer 25 are removed by etching, for example, to form the two through holes 253 in the lens layer 25.

An etching gas or the like having high selectivity with respect to the third sacrificial layer 53 is used to remove the portions of the lens layer 25. The third sacrificial layer 53 functions as an etch stopper layer. When the lens layer 25 is formed of silicon oxide, for example, it is preferable to perform gas etching using a fluorine-based etching gas such as hydrogen fluoride (HF) or wet etching using a fluorine-based etching solution such as hydrogen fluoride (HF). Note that, as illustrated in FIG. 16, a film of the same material as that of the lens layer 25 may be formed on the lens layer 25, so that the plurality of contacts 3 are not damaged by the etching.

Figure 17:
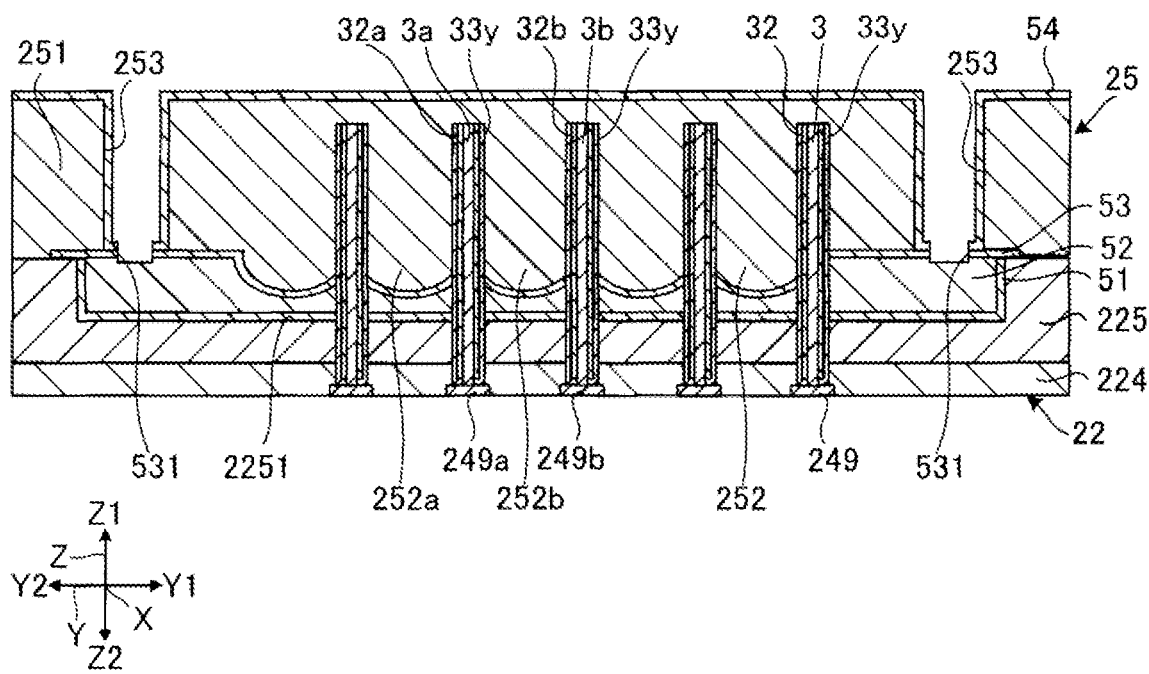
FIG. 17 is a cross-sectional view for describing a space forming step.
Figure 18:
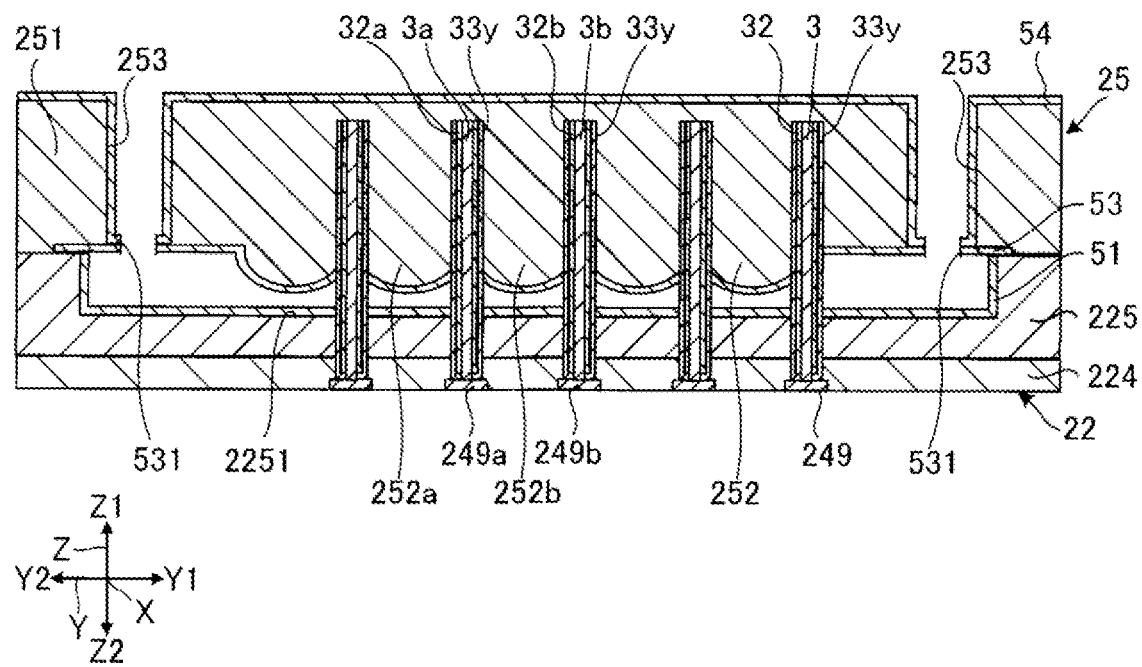
FIG. 18 is a cross-sectional view for describing the space forming step.
Figure 19:
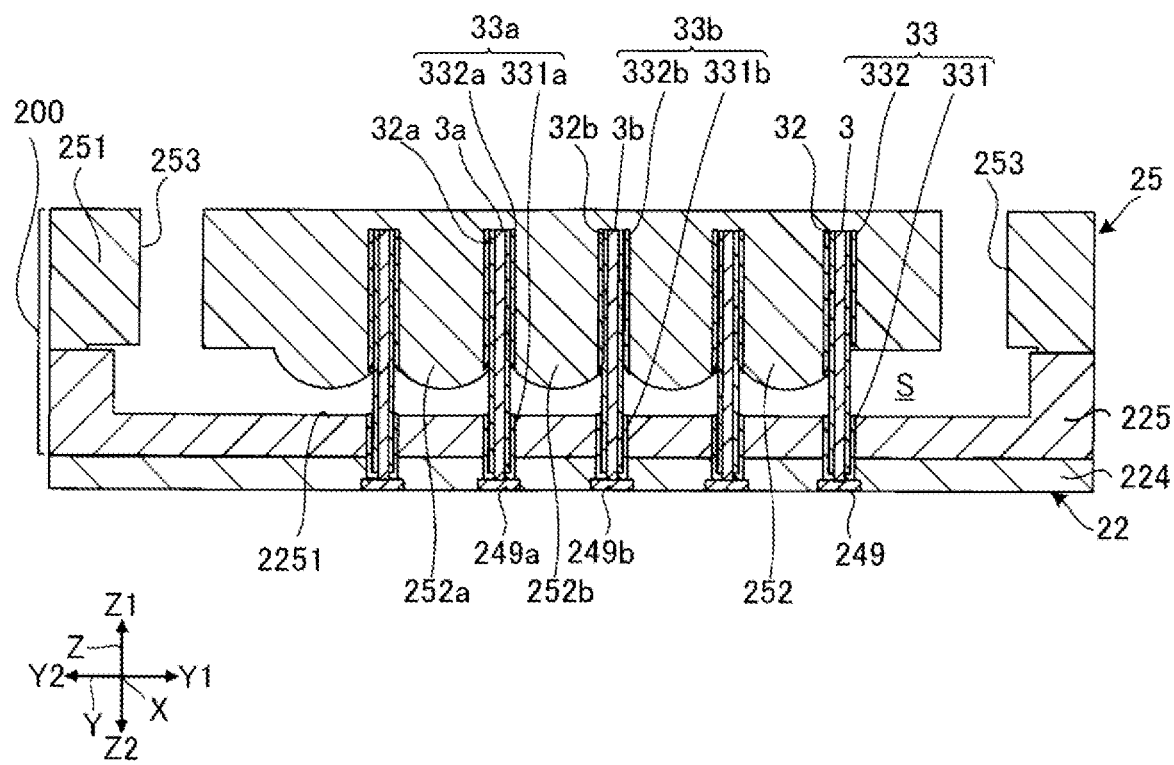
FIG. 19 is a cross-sectional view for describing the space forming step.

Each of FIG. 17, FIG. 18, and FIG. 19 is a cross-sectional view for describing the space forming step S18. In the space forming step S18, a fourth sacrificial layer 54 is first formed on the lens layer 25, as illustrated in FIG. 17. After that, two second through holes 531 are formed by removing portions of the third sacrificial layer 53 and portions of the fourth sacrificial layer 54. Note that each of the above-described through holes 253 is considered to be a first through hole.

The fourth sacrificial layer 54 is formed along a wall surface of each of the through holes 253. The fourth sacrificial layer 54 includes an inorganic material such as silicon. Further, the fourth sacrificial layer 54 may include an inorganic material other than silicon, such as a metal nitride such as titanium nitride, for example. The fourth sacrificial layer 54 is preferably the same material as the third sacrificial layer 53. The fourth sacrificial layer 54 is formed by a vapor deposition method such as CVD, for example. Further, etching back or the like is used to remove the portions of the third sacrificial layer 53 and the portions of the fourth sacrificial layer 54. The two second through holes 531 have a one-to-one correspondence with respect to the two through holes 253. Although not illustrated, each of the second through holes 531 overlaps with the corresponding through hole 253 in plan view. Further, the shape of each of the second through holes 531 in plan view is similar to the shape of the corresponding through hole 253 in plan view.

Next, as illustrated in FIG. 18, the second sacrificial layer 52 is removed by etching using the two through holes 253 and the two second through holes 531. A gas or the like having high selectivity with respect to the first sacrificial layer 51, the third sacrificial layer 53, and the fourth sacrificial layer 54 is used to remove the second sacrificial layer 52. When the second sacrificial layer 52 is formed of silicon oxide, for example, it is preferable to perform the gas etching using a fluorine-based etching gas such as hydrogen fluoride (HF) or the wet etching using a fluorine-based etching solution such as hydrogen fluoride (HF).

Further, when removing the second sacrificial layer 52, the first sacrificial layer 51 functions as a protective layer to protect the insulating layer 225. Therefore, the material of the first sacrificial layer 51 is preferably a material that is different from the material of the insulating layer 225 and that is highly resistant to the etching gas or the like used to remove the second sacrificial layer 52. Similarly, when removing the second sacrificial layer 52, the third sacrificial layer 53 serves as a protective layer to protect the lens layer 25. Therefore, the material of the third sacrificial layer 53 is preferably a material that is different from the material of the lens layer 25 and that is highly resistant to the etching gas or the like used to remove the second sacrificial layer 52. Further, when removing the second sacrificial layer 52, the fourth sacrificial layer 54 functions as a protective layer to protect the lens layer 25. Therefore, the material of the fourth sacrificial layer 54 is preferably a material that is different from the material of the lens layer 25 and that is highly resistant to the etching gas or the like used to remove the second sacrificial layer 52.

Further, when removing the second sacrificial layer 52, each of the first material films 33y protects the corresponding contact 3. Therefore, the material of the first material films 33y is preferably a material that is highly resistant to the etching gas or the like used to remove the second sacrificial layer 52.

Next, as illustrated in FIG. 19, each of the first sacrificial layer 51, the third sacrificial layer 53, and the fourth sacrificial layer 54 is removed by etching. As a result, the space S is formed between the lens group 250 and the insulating layer 225. In other words, the light-guiding portion 200 is formed.

For example, when each of the first sacrificial layer 51, the third sacrificial layer 53, and the fourth sacrificial layer 54 is formed of silicon, it is preferable to perform wet etching using a fluorine-based gas such as sulfur hexafluoride (SF6), wet etching using hydrofluoric acid or the like, or gas etching using a fluorine-based gas such as chlorine trifluoride (ClF3). Further, by using the same material for the first sacrificial layer 51, the third sacrificial layer 53, and the fourth sacrificial layer 54, the first sacrificial layer 51, the third sacrificial layer 53, and the fourth sacrificial layer 54 can be removed collectively. Note that gas etching is simply etching performed by supplying gas. Further, dry etching includes plasma etching, ion beam etching, and the like, and does not include gas etching.

In addition, when the first material film 33x is the same material as each of the first sacrificial layer 51, the third sacrificial layer 53, and the fourth sacrificial layer 54, a portion of each of the first material films 33y is removed when removing the first sacrificial layer 51, the third sacrificial layer 53, and the fourth sacrificial layer 54. Therefore, the protective portion 33 including the protective film 331 and the protective film 332 is formed from each of the first material films 33y. Thus, the first protective portion 33a including the first film 331a and the second film 331b and the second protective portion 33b including the third film 332a and the fourth film 332b are formed. Further, when removing the first sacrificial layer 51, the third sacrificial layer 53, and the fourth sacrificial layer 54, each of the inorganic material films 32 protects the corresponding contact 3. Therefore, the material of the inorganic material film 32 is preferably a material that is different from the material of the contact 3 and that is highly resistant to the etching gas or the like used for the removal.

In this way, since each of the contacts 3 is surrounded by the two layers of the inorganic material film 32 and the first material film 33y, it is possible to effectively prevent the contact 3 from being removed during the formation of the space S.

Figure 20:
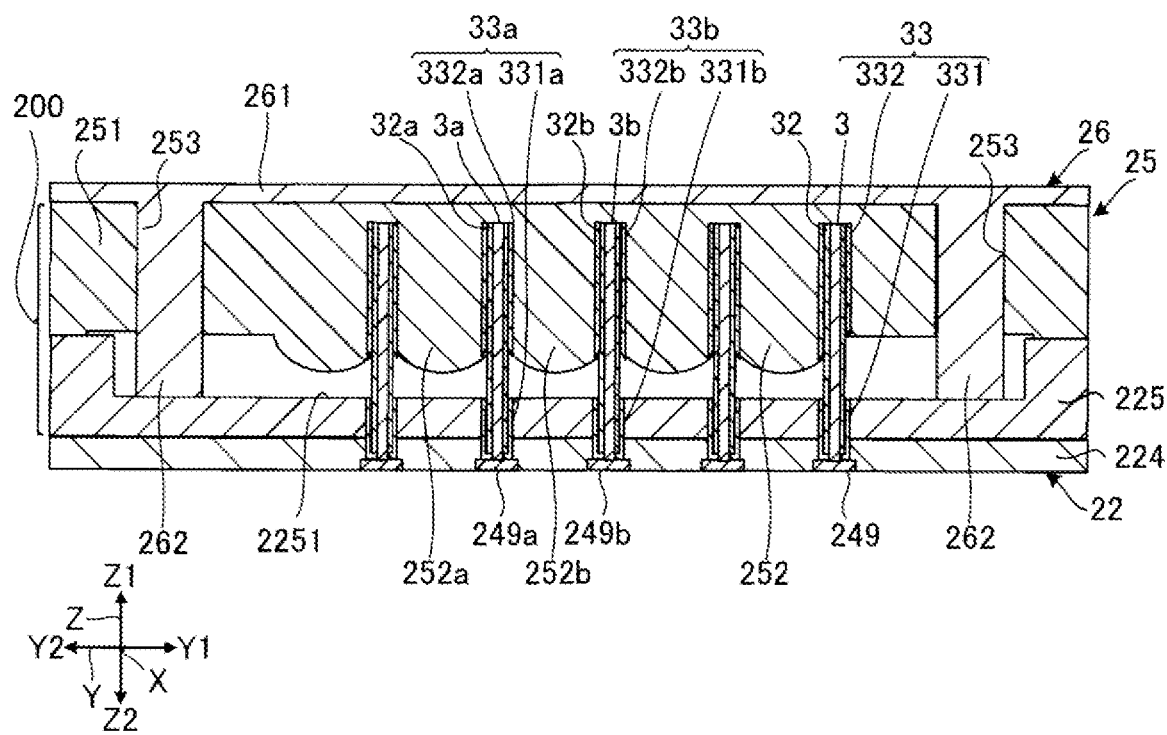
FIG. 20 is a cross-sectional view for describing a light-transmitting portion forming step.
Figure 21:
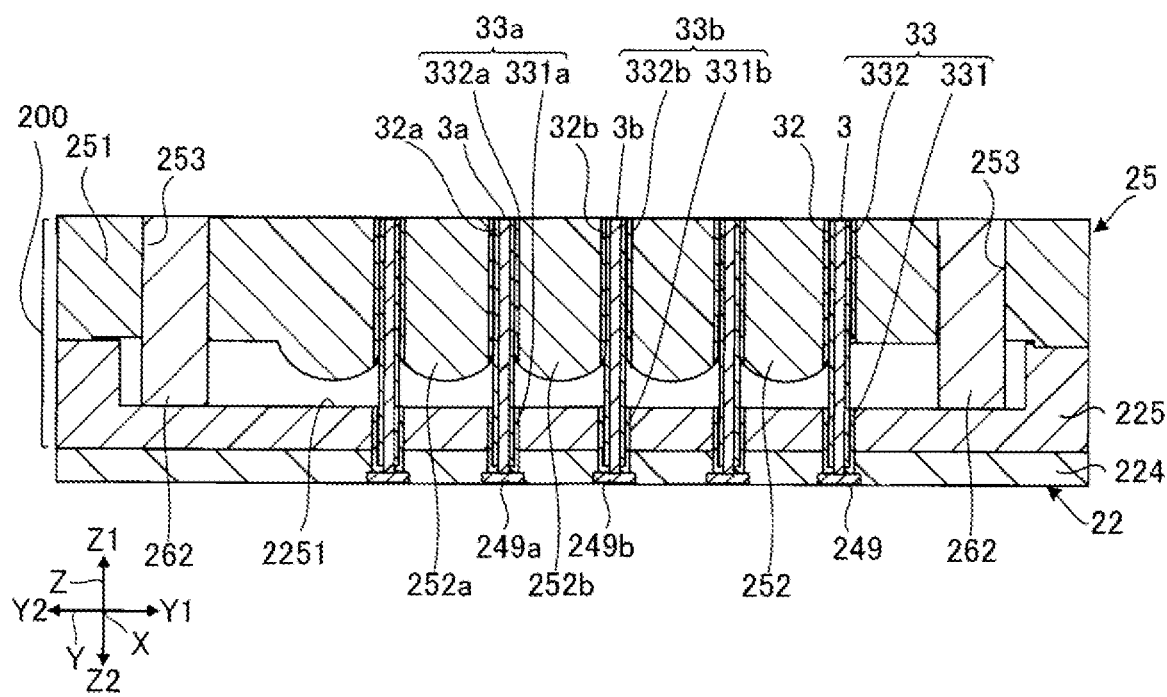
FIG. 21 is a cross-sectional view for describing the light-transmitting portion forming step.

Each of FIG. 20 and FIG. 21 is a cross-sectional view for describing the light-transmitting portion forming step S19. In the light-transmitting portion forming step S19, as illustrated in FIG. 20, the light-transmitting layer 26 is formed on the lens layer 25. The light-transmitting layer 26 is formed so as to fill the two through holes 253. The light-transmitting layer 26 includes a flat light-transmitting base 261 that extends in the X-Y plane, and the two light-transmitting portions 262. The light-transmitting layer 26 is transmissive and has insulating properties. The light-transmitting layer 26 includes a silicon based inorganic material such as silicon oxide, for example. The light-transmitting layer 26 is formed by a vapor deposition method such as CVD, for example.

Next, as illustrated in FIG. 21, the light-transmitting layer 26 is subjected to flattening by a polishing process such as CMP. In this way, the light-transmitting base portion 261 is mainly removed from the light-transmitting layer 26. As a result, the light-transmitting portion 262 remains in each of the through holes 253. Thus, each of the through holes 253 is filled by the corresponding light-transmitting portion 262. Further, the upper surface of the lens layer 25 is flattened as a result of the flattening treatment on the light-transmitting layer 26. In this way, top portions of the plurality of contacts 3 are exposed from the lens layer 25. Note that the light-transmitting base portion 261 may remain on the lens layer 25.

Note that the light-transmitting portion forming step S19 may be omitted. In other words, the two through holes 253 may be in an open state, without forming the two light-transmitting portions 262.

Next, in the pixel electrode forming step S20, although not illustrated, the pixel electrode group 28 including the plurality of pixel electrodes 28 is formed on the lens layer 25. Specifically, for example, the pixel electrode 28 is formed by depositing a layer formed of a transparent electrode material using a vapor deposition method, such as CVD, and then the layer is patterned using a mask. At this time, the plurality of pixel electrodes 28 are disposed so as to overlap with the plurality of lenses 252 in a one-to-one manner in plan view. Further, the plurality of pixel electrodes 28 are respectively coupled to the plurality of contacts 3. Thus, the first pixel electrode 28a overlaps with the first lens 252a in plan view, and is coupled to the first contact 3a. Similarly, the second pixel electrode 28b overlaps with the second lens 252b in plan view, and is coupled to the second contact 3b.

Further, the first oriented film 29 is formed on the pixel electrode group 280. For example, a layer made of silicon oxide or the like is formed by a vapor deposition method, such as CVD, and after that, a rubbing treatment is performed to form the first oriented film 29. As described above, the element substrate 2 illustrated in FIG. 4 is formed.

Note that the various circuits and the like, such as the scanning line drive circuits 11 illustrated in FIG. 1, are formed as appropriate in the above-described steps, or between the above-described steps. Further, for example, the counter substrate 4 is formed using a known technique as appropriate, and the element substrate 2 and the counter substrate 4 are bonded together via the sealing member 8. After that, the liquid crystal material is injected between the element substrate 2, the counter substrate 4, and the sealing member 8 to form the liquid crystal layer 9, and is then sealed. In this way, the liquid crystal display device 100 illustrated in FIG. 1 and FIG. 2 is manufactured.

As described above, the manufacturing method for the electro-optical device 100 includes the layered body forming step S11, the sacrificial layer forming step S12, the lens layer forming step S13, the contact hole forming step S14, the contact forming step S16, the through hole forming step S17, the space forming step S18, and the pixel electrode forming step S20. According to this method, the space S can be easily formed between the insulating layer 225 and the lens layer 25. Further, it is not necessary to route each of the contacts 3 to the outside of the lens group 250. Thus, according to the element substrate 2, the light-guiding portion 200 can be provided between the plurality of transistors 23 and the pixel electrode group 280 without complicating the arrangement of each of the contacts 3. Further, positioning accuracy between the plurality of lenses 252, the plurality of contacts 3, and the plurality of relay electrodes 249 can be improved.

1E. Modified Examples

The embodiment exemplified above can be modified in various manners. Specific modified modes that can be applied to the embodiment described above are exemplified below. Two or more modes freely selected from the exemplifications below can be appropriately used in combination as long as mutual contradiction does not arise.

In the embodiment described above, the plurality of lenses 252 are disposed in a one-to-one manner, in plan view, with respect to the plurality of pixel electrodes 28, but the lens 252 need not necessarily be disposed for each of all of the pixel electrodes 28.

In the embodiment described above, all of the contacts 3 penetrate the lens layer 25 and the space S, but the contact 3 that does not extend through the lens layer 25 or the space S may be present.

In the embodiment described above, the element substrate 2 may include a light-shielding film disposed between the lens layer 25 and the first oriented film 29, for example. This light-shielding film is disposed so as to surround the lens group 250 in plan view. Stray light of light that does not extend through the lens group 250 is suppressed by this light-shielding film.

In the embodiment described above, the element substrate 2 includes the plurality of inorganic material films 32 and the plurality of protective portions 33. However, depending on the material of the contact 3, for example, the plurality of inorganic material films 32 and the plurality of protective portions 33 may be omitted.

In the embodiment described above, the second sacrificial layer 52 is formed from the inorganic material, but may be a coating material mainly containing a PI (polyimide) organic component. The second sacrificial layer 52 is formed after forming the transistors 23, the relay electrodes 249, the wiring lines (not illustrated), and the like. Therefore, by using the coating material containing an organic component as the main component as the material of the second sacrificial layer 52, the second sacrificial layer 52 can be formed at a low temperature, and it is possible to avoid damage to the wiring lines and the like as a result of depositing the material at a high temperature.

In the embodiment described above, a case in which the TFT is used as the transistor is described as an example, but the transistor is not limited to being the TFT, and may be, for example, a metal-oxide-semiconductor field-effect transistor (MOSFET) or the like.

In the embodiment described above, the active matrix drive electro-optical device 100 is illustrated, but the electro-optical device 100 is not limited to this example, and the drive method of the electro-optical device may be a passive matrix drive method or the like, for example.

2. Electronic Apparatus

The electro-optical device 100 can be used for various electronic apparatuses.

Figure 22:
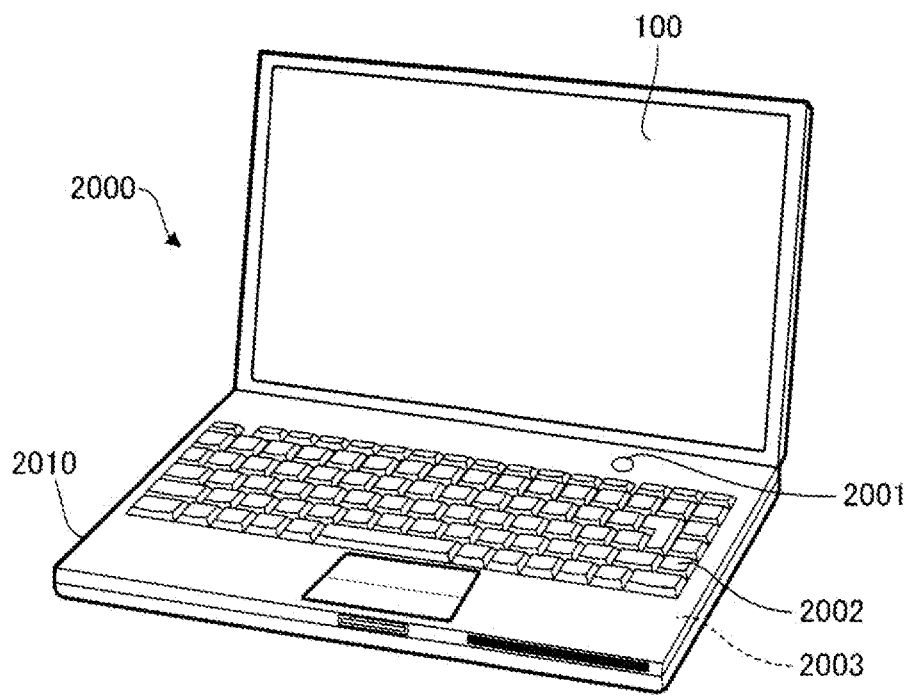
FIG. 22 is a perspective view illustrating a personal computer as an example of an electronic apparatus.

FIG. 22 is a perspective view illustrating a personal computer 2000 as an example of the electronic apparatus. The personal computer 2000 includes the electro-optical device 100 that displays various images, a main body portion 2010 in which a power source switch 2001 and a keyboard 2002 are installed, and a control unit 2003. The control unit 2003 includes a processor and a memory, for example, and controls the operation of the electro-optical device 100.

Figure 23:
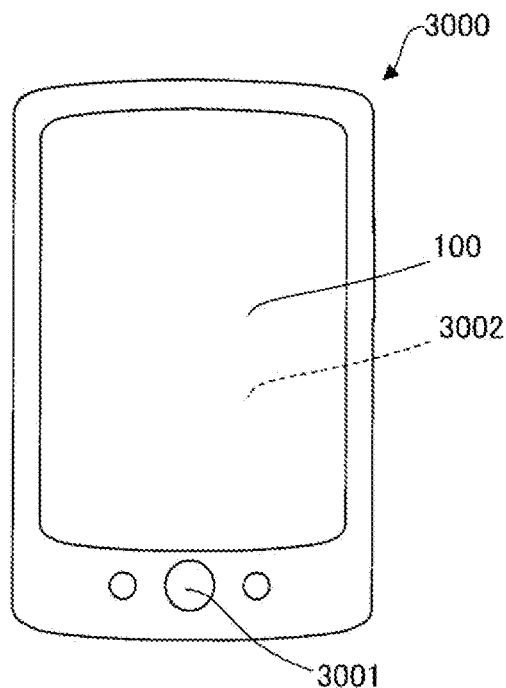
FIG. 23 is a perspective view illustrating a smart phone as an example of the electronic apparatus.

FIG. 23 is a perspective view illustrating a smartphone 3000 as an example of the electronic apparatus. The smartphone 3000 includes an operation button 3001, the electro-optical device 100 that displays various images, and a control unit 3002. Screen content displayed on the electro-optical device 100 is changed in accordance with the operation of the operation button 3001. The control unit 3002 includes a processor and a memory, for example, and controls the operation of the electro-optical device 100.

Figure 24:
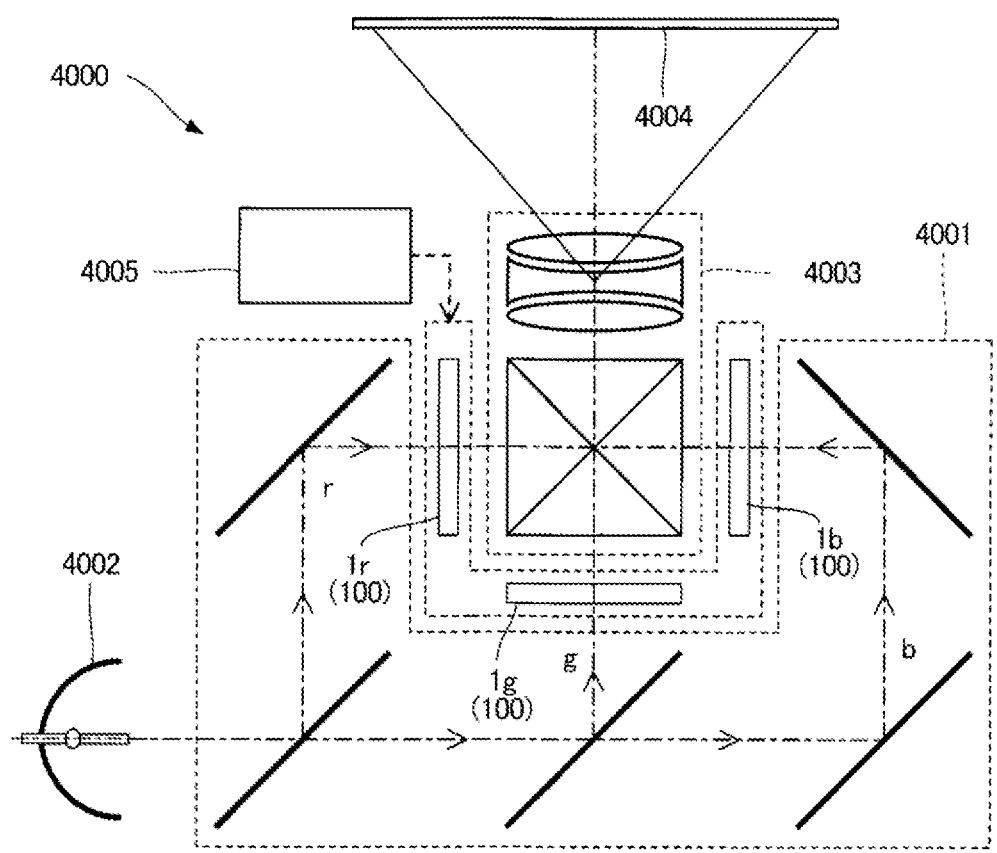
FIG. 24 is a schematic diagram illustrating a projector as an example of the electronic apparatus.

FIG. 24 is a schematic diagram illustrating a configuration of a projector as an example of the electronic apparatus. A projection-type display device 4000 is a three-plate type projector, for example. An electro-optical device 1r is the electro-optical device 100 corresponding to a red display color, an electro-optical device 1g is the electro-optical device 100 corresponding to a green display color, and an electro-optical device 1b is the electro-optical device 100 corresponding to a blue display color. Specifically, the projection-type display device 4000 includes the three electro-optical devices 1r, 1g, and 1b that respectively correspond to the display colors of red, green, and blue. A control unit 4005 includes a processor and a memory, for example, and controls the operation of the electro-optical devices 100.

An illumination optical system 4001 supplies a red component r, of light emitted from an illumination device 4002 as a light source, to the electro-optical device 1r, a green component g of the light to the electro-optical device 1g, and a blue component b of the light to the electro-optical device 1b. Each of the electro-optical devices 1r, 1g, and 1b functions as an optical modulator, such as a light valve, that, depending on a display image, modulates the light of each of the colors supplied from the illumination optical system 4001. A projection optical system 4003 synthesizes the light emitted from each of the electro-optical devices 1r, 1g, and 1b and projects the synthesized light onto a projection surface 4004.

The electronic apparatus includes the above-described electro-optical device 100 and the control unit 2003, 3002, or 4005. The electro-optical device 100 can improve lens performance. As a result, the size of each of the personal computer 2000, the smartphone 3000, and the projection-type display apparatus 4000 can be made more compact and the display quality thereof can be improved.

Note that the electronic apparatus to which the electro-optical device according to the present disclosure is applied is not limited to the exemplified apparatuses, and includes a personal digital assistant (PDA), a digital still camera, a television, a video camera, a car navigation device, a display device for in-vehicle use, an electronic organizer, electronic paper, an electronic calculator, a word processor, a workstation, a visual telephone, a point of sale (POS) terminal, and the like. Other examples of the electronic apparatus to which the present disclosure is applied further include a printer, a scanner, a copier, a video player, and a device provided with a touch panel.

The present disclosure is described above based on the preferred embodiments, but the present disclosure is not limited to each of the embodiments described above. In addition, the configuration of each component of the present disclosure may be replaced with any configuration that exerts the equivalent functions of the above-described embodiments, and to which any configuration may be added.

Further, in the above description, the liquid crystal device is described as an example of the electro-optical device of the present disclosure, but the electro-optical device of the present disclosure is not limited thereto. For example, the electro-optical device of the present disclosure can also be applied to an image sensor or the like. Further, for example, in a similar manner to the embodiment described above, the present disclosure can be applied to a display panel using a light-emitting element, such as organic electroluminescence (EL) element, inorganic EL, a light-emitting polymer, and the like. Further, in a similar manner to the embodiment described above, the present disclosure can also be applied to an electrophoretic display panel that uses micro capsules each including colored liquid and white particles distributed in the liquid.

What is claimed is:

1. An electro-optical device comprising:
   a pixel electrode group including a first pixel electrode and a second pixel electrode;
   a layered body including a plurality of insulating layers;
   a first transistor disposed at the layered body;
   a second transistor disposed at the layered body;
   a lens layer including a first lens that overlaps with the first pixel electrode when viewed from a thickness direction of the layered body, and a second lens that overlaps with the second pixel electrode when viewed from the thickness direction;
   a first contact configured to electrically couple the first transistor and the first pixel electrode; and
   a second contact configured to electrically couple the second transistor and the second pixel electrode, wherein
   the layered body, the lens layer, and the pixel electrode group are arranged in this order,
   each of the first lens and the second lens, and the layered body are disposed with a space interposed therebetween, and
   each of the first contact and the second contact extends through the lens layer and the space.

2. The electro-optical device according to claim 1, wherein
   the first contact and the first lens are disposed at different positions when viewed from the thickness direction, and
   the second contact and the second lens are disposed at different positions when viewed from the thickness direction.

3. The electro-optical device according to claim 1, wherein
   each of the first contact and the second contact includes a tungsten plug.

4. The electro-optical device according to claim 1, further comprising:
   a first inorganic material film in contact with an outer peripheral surface of the first contact and including an inorganic material containing silicon; and
   a second inorganic material film in contact with an outer peripheral surface of the second contact and including an inorganic material containing silicon.

5. The electro-optical device according to claim 1, wherein
   the layered body further includes a first contact hole and a second contact hole,
   the lens layer further includes a third contact hole overlapping with the first contact hole when viewed from the thickness direction, and a fourth contact hole overlapping with the second contact hole when viewed from the thickness direction, the first contact includes a portion disposed in the first contact hole and a portion disposed in the second contact hole, and the second contact includes a portion disposed in the third contact hole and a portion disposed in the fourth contact hole.

6. The electro-optical device according to claim 5, further comprising:

a first relay electrode disposed at the layered body and electrically coupled to the first transistor;

a second relay electrode disposed at the layered body and electrically coupled to the second transistor;

a first film including an inorganic material different from a material of the layered body and in contact with a wall surface of the first contact hole; and a second film including an inorganic material different from the material of the layered body and in contact with a wall surface of the second contact hole, wherein the first contact extends through the first film and is in contact with the first relay electrode, and the second contact extends through the second film and is in contact with the second relay electrode.

7. The electro-optical device according to claim 5, further comprising:

a third film including an inorganic material different from a material of the lens layer and in contact with a wall surface of the third contact hole; and a fourth film including an inorganic material different from the material of the lens layer and in contact with a wall surface of the fourth contact hole.

8. The electro-optical device according to claim 1, wherein the lens layer includes a through hole disposed at a position different from the first contact and the second contact when viewed from the thickness direction.

9. The electro-optical device according to claim 8, further comprising:

a light-transmitting portion that fills the through hole, the light-transmitting portion having light transmissivity and insulating properties.

10. An electronic apparatus comprising:

the electro-optical device according to claim 1; and a control unit configured to control operation of the electro-optical device.

11. A manufacturing method for an electro-optical device, the method comprising:

forming a layered body in which a plurality of insulating layers are layered, a first transistor disposed at the layered body, and a second transistor disposed at the layered body;

forming a sacrificial layer at the layered body, the sacrificial layer including an inorganic material forming a lens layer at the sacrificial layer, the lens layer including a first lens and a second lens;

forming a first hole extending through the sacrificial layer and the lens layer, and a second hole extending through the sacrificial layer and the lens layer;

forming a first contact in the first hole, and forming a second contact in the second hole, the first contact being electrically coupled with the first transistor, and the second contact being electrically coupled with the second transistor;

forming a through hole in the lens layer;

forming a space between the lens layer and the layered body by removing the sacrificial layer using the through hole; and forming a first pixel electrode overlapping with the first lens when viewed from a thickness direction of the lens layer, and a second pixel electrode overlapping with the second lens when viewed from the thickness direction, the first pixel electrode being coupled to the first contact, and the second pixel electrode being coupled to the second contact.

\* \* \* \* \*